United States Patent
Ichikawa et al.

(10) Patent No.: US 6,784,281 B2
(45) Date of Patent: Aug. 31, 2004

(54) LOW ALLERGENIC NATURAL RUBBER AND METHOD OF PREPARING LOW ALLERGENIC NATURAL RUBBER LATEX

(75) Inventors: Naoya Ichikawa, Kobe (JP); Yoshiaki Miyamoto, Kobe (JP); Masaharu Hayashi, Tokyo (JP)

(73) Assignees: Sumitomo Rubber Industries, Ltd., Kobe (JP); KAO Corporation, Tokyo (JP)

( * ) Notice: Subject to any disclaimer, the term of this patent is extended or adjusted under 35 U.S.C. 154(b) by 0 days.

(21) Appl. No.: 09/986,374

(22) Filed: Nov. 8, 2001

(65) Prior Publication Data

US 2002/0091232 A1 Jul. 11, 2002

(30) Foreign Application Priority Data

| Nov. 8, 2000 | (JP) | 2000-340729 |
| Nov. 8, 2000 | (JP) | 2000-340730 |
| Nov. 8, 2000 | (JP) | 2000-340731 |
| Nov. 8, 2000 | (JP) | 2000-340732 |

(51) Int. Cl.$^7$ .............. C08L 1/04; C08L 19/00
(52) U.S. Cl. .......... 528/932; 528/934; 528/935
(58) Field of Search ............... 525/932, 934, 525/935

(56) References Cited

U.S. PATENT DOCUMENTS

| 5,569,740 A | * | 10/1996 | Tanaka et al. | ........... 528/502 F |
| 5,910,567 A | * | 6/1999 | Tanaka et al. | ............... 528/491 |
| 5,998,512 A | | 12/1999 | Schloman | |
| 6,204,358 B1 | * | 3/2001 | Tanaka et al. | ............... 528/932 |
| 6,239,253 B1 | * | 5/2001 | Tanaka et al. | ............... 528/494 |
| 6,335,407 B1 | * | 1/2002 | Tanaka et al. | ........... 526/238.3 |

FOREIGN PATENT DOCUMENTS

| EP | 0 584 597 A1 | 3/1994 |
| JP | 2905005 | 3/1994 |
| JP | 09-071604 | 3/1997 |
| JP | 2000-017002 | 1/2000 |

OTHER PUBLICATIONS

Webster's II New Riverside University Dictionary, 1988, Houghton Mifflin Company, p. 93.*
Baur et al., Allergy, vol. 52, pp. 661–664, (1997).

* cited by examiner

*Primary Examiner*—Nathan M. Nutter
(74) *Attorney, Agent, or Firm*—Birch, Stewart, Kolasch & Birch, LLP

(57) ABSTRACT

A method of preparing a low allergic natural rubber latex which is less likely to cause allergy, comprising adding a protease having an exopeptidase activity to a natural rubber latex and aging the natural rubber latex, thereby to decompose a protein in the latex to such a degree that the protein and a protein decomposition product, which have a number-average molecular weight of 4500 or more, are not detected; a method of preparing a deproteinized natural rubber latex which is less likely to cause allergy, comprising adding an alkali protease to a natural rubber latex, thereby to decompose a protein in the latex, adding a protease having an exopeptidase activity, thereby to further decompose the protein and a decomposition product thereof in the latex, and removing the protein and the decomposition product thereof; a low allergic natural rubber obtained by a decomposition treatment of a protein, wherein the protein and a protein decomposition product, which have a number-average molecular weight of 4500 or more, are not detected; and a deproteinized natural rubber obtained by a decomposition treatment and a removing treatment of a protein, wherein the content of the protein is 0.02% or less in terms of a nitrogen content, an absorption at 3280 cm$^{-1}$ is not recognized in an infrared absorption spectrum, and the protein and a protein decomposition product, which have a number-average molecular weight of 4500 or more, are not detected.

13 Claims, 8 Drawing Sheets

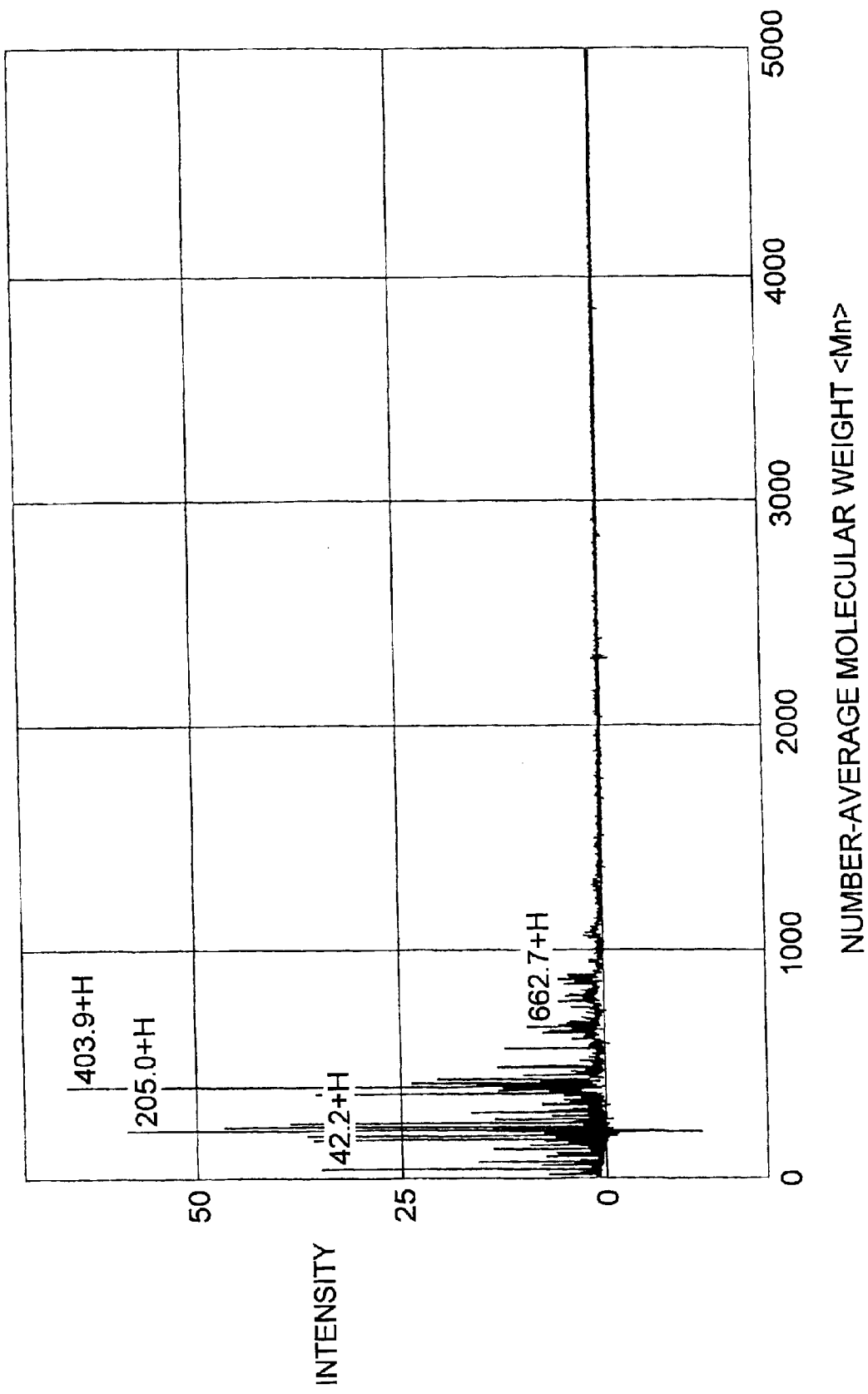

LOW ALLERGENIC NATURAL RUBBER AND METHOD OF PREPARING LOW ALLERGENIC NATURAL RUBBER LATEX

BACKGROUND OF THE INVENTION

The present invention relates to a method of preparing a natural rubber latex and a method of preparing a deproteinized natural rubber latex, which are less likely to cause allergy, and a low allergenic natural rubber and a deproteinized natural rubber.

Natural rubbers have widely been used in various fields, for example, household appliances such as glove, medical appliances such as surgical glove and various catheters, lactation appliances, contraceptive device and the like because of features such as large extension, high elasticity and strong film strength. It has recently been reported that, when using medical appliances made of the natural rubber, such as surgical glove and various catheters, immediate (I type) allergy, which shows symptoms such as respiratory distress and anaphylactoid symptom (e.g. vascular edema, urttication, cyanosis, etc.), is caused. It is presumed that such immediate allergy is caused by a protein, as an antigen, in the natural rubber.

Accordingly, a trial of highly removing a protein in a natural rubber latex has recently been made and Japanese Patent No. 2,905,005 [Japanese Published Unexamined Patent (Kokai Tokkyo Koho Hei) No. 6-56902] discloses a method of adding a proteolytic enzyme such as alkali protease and a surfactant in a natural rubber latex, thereby subjecting to a deproteinization treatment, and sufficiently washing the latex by a centrifugation treatment.

According to the method described in the above patent publication, the protein in the natural rubber can be highly decomposed and removed. Specifically, the amount of the protein contained in the natural rubber, which is represented by the nitrogen content (N%) as determined by the Kjeldahl's method, can be controlled to a very low value such as 0.02% or less. It is generally presumed that the natural rubber is a mixture of a high-molecular component having a number-average molecular weight <Mn> of 1,000,000 to 2,500,000 and a low-molecular component having a number-average molecular weight of 100,000 to 200,000, the former high-molecular component being formed by mutually bonding the low-molecular components via peptide molecules contained in the natural rubber. Assuming that the molecular weight of the low-molecular component, which is deemed to be formed by original biosynthesis, is 100,000 and one peptide molecule in an intermolecular bond, i.e. one nitrogen atom (atomic weight: 14) is bonded based on one rubber molecule of this low-molecular component, the nitrogen content of the natural rubber is 0.014%. Accordingly, it is considered that about 0.02% of nitrogen is inevitably remained even if subjected to a high deproteinization treatment.

In case of subjecting to the deproteinization treatment by the method described in the above publication, an infrared absorption spectrum at 3280 $cm^{-1}$ peculiar to polypeptide is not observed in a rubber film formed by using the treated natural rubber latex. Therefore, it has been found that decomposition and removal of the protein are highly achieved by the method described in the above publication.

However, as is apparent from recent studies, there still exists a possibility of exhibiting allergy even if the protein is decomposed and removed through various conventionally known deproteinization treatments, including the method described in the above publication.

According to the present inventors, (i) analysis was carried out by an analysis system of a protein, comprising a combination of a time of flight (TOF) type mass spectrometer and a two-dimensional surface decorative chip so as to confirm what degree a protein and a decomposition product thereof are remained in a natural rubber latex subjected to a deproteinization treatment by a conventional method, and (ii) in vitro measurement based on an antigen-antibody reaction using serum of human patients was carried out in place of conventional in vivo measurement by a patch test so as to confirm allergy of a natural rubber latex subjected to a deproteinization treatment by a conventional method.

As a result, it has been found that:

(I) a protein or protein decomposition product having a number-average molecular weight <Mn> of about 4500 to 4700 is remained and the protein is not sufficiently decomposed, and (II) an allergenic protein is included in the amount enough to cause immediate allergy even after the deproteinization treatment.

The term "allergenic protein" is defined as follows in the present Invention. Any protein and decomposition product thereof (hereinafter referred to as a "whole protein") in a sample of a natural rubber latex contain the group of an "antigen protein" capable of producing an antibody in human serum. Antibodies produced in human serum are classified into an IgE-antibody capable of causing an allergic reaction and an antibody other than an IgE-antibody capable of causing no allergic reaction. Among the "antigen protein", the antigen protein capable of producing the IgE-antibody, which can cause the allergic reaction, is referred to as an "allergenic protein" so as to distinguish from other antigen proteins.

Thus, an object of the present invention is to provide a method of preparing a low allergenic natural rubber latex which substantially contains no allergenic protein and is therefore less likely to cause allergy.

Another object of the present invention is to provide a method of preparing a deproteinized natural rubber latex which substantially contains no allergenic protein and is therefore less likely to cause allergy.

Still another object of the present invention is to provide a natural rubber latex which is less likely to cause allergy because of high degree of the decomposition of a protein.

Further object of the present invention is to provide a deproteinized rubber latex which is less likely to cause allergy because of high degree of the decomposition and removal of a protein.

SUMMARY OF THE INVENTION (I) The method of preparing a low allergenic natural rubber latex of the present invention has a feature that it comprises adding a protease having an exopeptidase activity to a natural rubber latex and aging the natural rubber latex, thereby to decompose a protein in the latex to such a degree that the protein and a protein decomposition product, which have a number-average molecular weight of 4500 or more, are not detected.

(II) The method of preparing a deproteinized natural rubber latex of the present invention has a feature that it comprises adding an alkali protease to a natural rubber latex, thereby to decompose a protein in the latex, adding a protease having an exopeptidase activity, thereby to further decompose the protein and a decomposition product thereof in the latex, and removing the protein and the decomposition product thereof.

(III) The low allergenic natural rubber of the present invention has a feature that it is a natural rubber obtained by a decomposition treatment of a protein, wherein the protein and a protein decomposition product, which have a number-average molecular weight of 4500 or more, are not detected.

(IV) The deproteinized natural rubber of the present invention has a feature that it is a natural rubber obtained by a decomposition treatment and a removing treatment of a protein, wherein the content of the protein is 0.02% or less in terms of a nitrogen content, an absorption at 3280 $cm^{-1}$ is not recognized in an infrared absorption spectrum, and the protein and a protein decomposition product, which have a number-average molecular weight of 4500 or more, are not detected.

A protease (proteolytic enzyme) used in a conventional deproteinization treatment is a protease produced mainly by bacteria, and the protease has an optimum pH in an alkali range and also has an endopeptidase activity but does not exhibit an exopeptidase activity. The reason why the alkali protease was mainly used in a conventional deproteinization treatment is as follows: (a) a field latex as a natural rubber is supplied in the form of a so-called ammonia latex prepared by concentrating the latex and adding ammonia for the purpose of preventing coagulation and putrefaction of the latex, and the latex itself exhibits alkalinity; (b) and, therefore, it was necessary to use a so-called alkali protease having an optimum pH in an alkali range so as to avoid coagulation of rubber molecules. Characteristics of a commercially available alkali protease, which has used in a conventional deproteinization treatment, are shown in Table 1.

TABLE 1

| Bacteria which produced enzyme | Activity | | | Service |
|---|---|---|---|---|
| Trade name of enzyme | Endo | Exo | pH | temperature (° C.) |
| Bacillus subtilus Bioprase*4 | ◉ | — | 8.1–12 | 50–70 |
| Bacillus subtilus Proleather FG-F | ◉ | — | 8.6–12 | 53–67 |
| Bacillus subtilus PW-102*1 | ◉ | — | 9.0–12 | 30–50 |
| Bacillus subtilus N "Amano"*3 | ◉ | — | 6.6–8.2 | 48–62 |
| Bacillus sp Savinase*2 | ◉ | — | 7.7–12 | 47–58 |
| Bacillus licheniformis Alcalase*2 | ◉ | — | 6.1–11 | 48–66 |
| Bacillus letus Esperase*2 | ◉ | — | 7.2–10 | 52–65 |
| Bacillus stearothermo S "Amano"*3 | ◉ | — | 6.6–9.5 | 62–77 |

Manufacturer:
1: Kao Corp.,
2: Novo-Nordisk Bioindustri A/S,
3: Amano Enzyme, Inc.,
4: Nagase Biochemicals, Ltd.
Activity:
◉: very high,
○: high,
—: no activity
Regarding the trade name of bacteria which produced an enzyme, the genus is shown in the upper column, while species are shown in the lower column.

The present inventors have made a trial of performing a decomposition treatment of a protein using a protease having an exopeptidase activity in place of a conventional alkali protease. As a result, they have surprisingly found a novel fact that the protein can be decomposed to such a degree that the protein and the protein decomposition product, which have a number-average molecular weight <Mn> of 4500 or more, do not substantially exist, thereby making it possible to obtain a natural rubber latex which is less likely to cause allergy. Thus, the invention (I) of the above-described method of preparing a low allergenic natural rubber latex has been completed.

From another point of view, the present inventors have made a trial of performing a decomposition treatment of a protein using a protease having an exopeptidase activity and a removing treatment of the protein and the protein decomposition product thereof, in addition to the decomposition treatment of the protein using a conventional alkali protease. As a result, they have surprisingly found a novel fact that the protein can be decomposed and removed to such a degree that the protein and the protein decomposition product, which have a number-average molecular weight <Mn> of 4500 or more do not substantially exist, thereby making it possible to obtain a deproteinized rubber latex which is less likely to cause allergy. Thus, the invention (II) of the above-described method of preparing a low allergenic natural rubber latex has been completed.

In the present invention, the protein and the protein decomposition product are usually detected by mass spectrometry, and preferably detected by using an analysis system of a protein, comprising a combination of a time of flight (TOF) type mass spectrometer and a two-dimensional surface decorative chip [for example, protein structure analyzer "Protein Chip™ System", manufactured by Ciphergen Biosystems, Inc.]. According to the Protein Chip™ System, it is made possible to detect a protein in a trace amount such as about 0.1 $\mu$g per 1 mL of a natural rubber latex.

Japanese Published Unexamined Patent (Kokai Tokkyo Koho Hei) No. 9-71604 describes that a surfactant is added to a natural rubber latex and, after adjusting the pH by adding a neutralizing agent, a proteolytic enzyme is added, thereby to decompose a protein in the latex. However, the publications merely describes about a decomposition treatment of a protein using an enzyme and does not disclose to what degree a molecular weight of the protein is reduced by such a treatment. The invention described in the publication has a feature in an extraction treatment, which comprises decomposing a protein using an enzyme, incorporating a vulcanizing agent in a latex, forming and vulcanizing the latex, dipping the vulcanized latex in a diluted alkali solution, and extracting the decomposed protein.

In the method of preparing a low allergenic natural rubber latex of the present invention (I), it is preferred to remove the protein and the decomposition product thereof in the latex after decomposing the protein in view of further reduction of allergy. Such removal treatment is preferably carried out by a centrifugation treatment in view of the removing effect and the efficiency of the removal treatment.

In the method of preparing a deproteinized natural rubber latex of the present invention (II), it is preferred to remove the protein and the decomposition product thereof by a centrifugation treatment in view of the removing effect and the efficiency of the removal treatment.

In the preparation methods of the present inventions (I) and (II), the pH of the latex is preferably adjusted to a neutral range (specifically pH 6 to 9) before treating with a protease having an exopeptidase. The reason is as follows. That is, since almost any protease having an exopeptidase activity has an optimum pH in the range of 6 to 9, and preferably about 6.5 to 8.5, the effect of the protein decomposition treatment can be enhanced if the pH of the latex is in the neutral range.

The protease having an exopeptidase activity used in the present inventions (I) and (II) is preferably a protease produced by microorganisms, which belong to the genus Aspergillus or Rhizopus, as a kind of filamentous bacteria. The peptidase derived from filamentous bacteria is suited for high degree decomposition of the protein.

The protease having an exopeptidase activity is more preferably a protease produced by microorganisms, which belong to *Aspergillus oryzae*, microorganisms which belong to *Aspergillus mellus*, or a protease produced by microorganisms which belong to *Rhizopus oryzae*, among those produced by microorganisms which belong to the genera described above.

In the preparation methods of the present inventions (I) and (II), the decomposition treatment of the protein is preferably carried out in the presence of a surfactant from such a view point that rubber molecules are stably dispersed in the latex, thereby to improve the decomposition of the protein.

Regarding the low allergenic natural rubber of the present invention (III), as is apparent from the fact that the protein and the protein decomposition product, which have a number-average molecular weight <Mn> of 4500 or more, are not detected, the protein is highly decomposed as compared with the case when subjected to a deproteinization treatment by a conventionally known method. Therefore, it is considered that almost any portion, which can serve as an antigen capable of an IgE-antibody against human serum, is eliminated or denatured by the decomposition treatment, and allergy is less likely to occur.

Regarding the low allergenic natural rubber of the present invention (III), since the protein highly decomposes, a possibility of causing allergy is markedly reduced. Accordingly, it is suited for use as raw materials of household appliances such as gloves, medical appliances such as a surgical catheter, lactation appliances, contraceptive device and the like.

Regarding the deproteinized natural rubber of the present invention (IV), it is apparent that the total amount of the protein contained in the natural rubber is highly reduced similar to a conventional deproteinization treatment because the content of the protein is 0.02% or less in terms of a nitrogen content and an absorption at 3280 cm$^{-1}$ is not recognized in an infrared absorption spectrum.

Moreover, as is apparent from the fact that the protein and the protein decomposition product, which have a number-average molecular weight <Mn> of 4500 or more, are not detected, the protein is highly decomposed as compared with the natural rubber subjected to a deproteinization treatment by a conventionally known method. Therefore, it is considered that almost any portion, which can serve as an antigen capable of an IgE-antibody against human serum, is eliminated or denatured by the decomposition treatment, and an allergic reaction is less likely to occur.

Regarding the deproteinized natural rubber of the present invention (IV), since the protein highly decomposes, a possibility of causing allergy is markedly reduced. Accordingly, it is suited for use as raw materials of household appliances such as glove, medical appliances such as a surgical catheter, lactation appliances, contraceptive device and the like.

BRIEF DESCRIPTION OF THE DRAWINGS

FIG. 8 is a graph showing the measurement results of a number-average molecular weight <Mn> of the remaining protein and protein decomposition product with respect to deproteinized natural rubber latexes obtained in Examples 10 and 23.

DETAILED DESCRIPTION OF THE INVENTION

Figure 1:
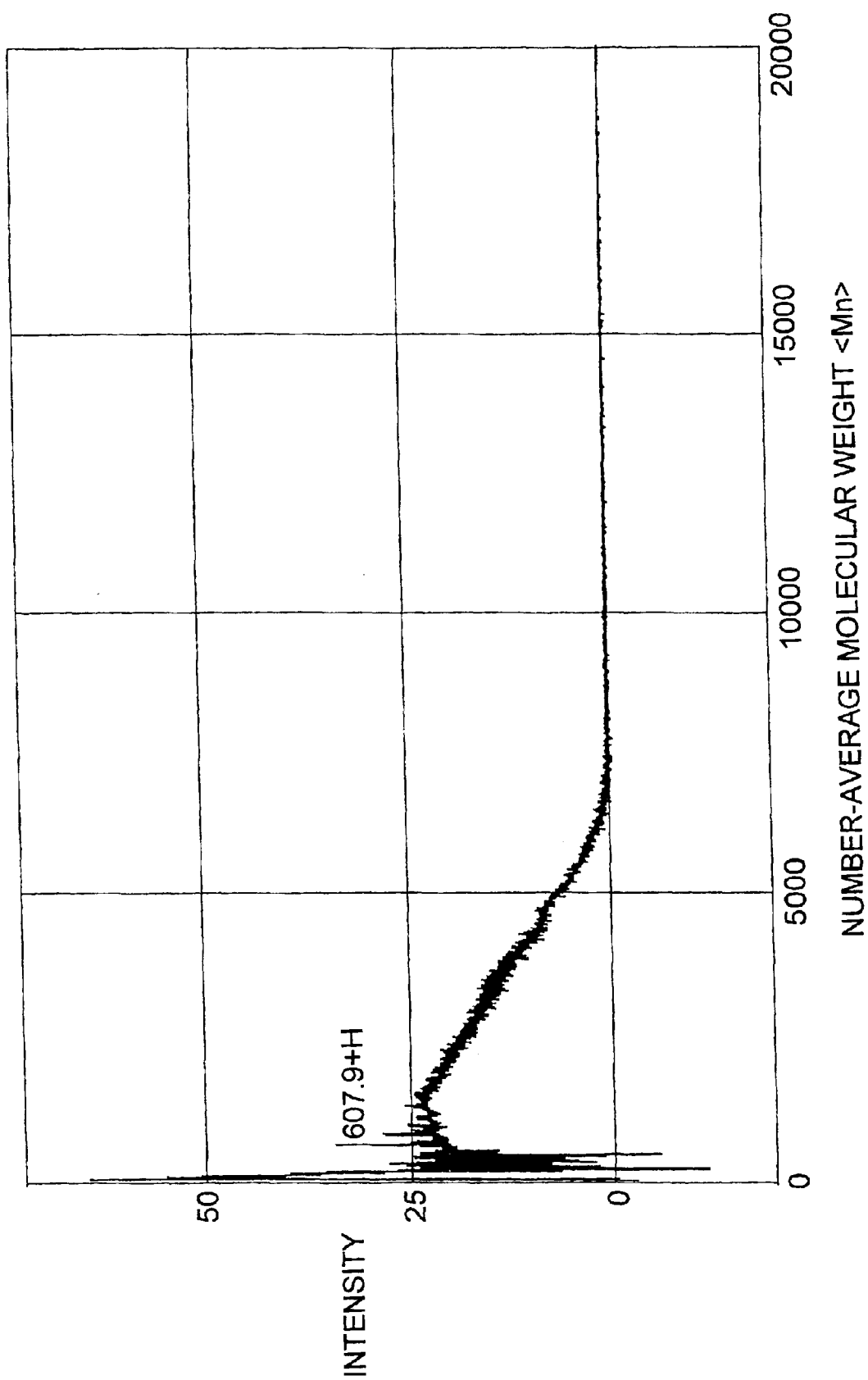
FIG. 1 is a graph showing the measurement results of a number-average molecular weight <Mn> of the remained protein and protein decomposition product with respect to low allergenic natural rubber latexes obtained in Examples 1 and 13 which have been subjected only to a protein decomposition treatment.

A. The method of preparing a low allergenic natural rubber latex of the present invention (I) will be described in detail.

The method of preparing a low allergenic natural rubber latex of the present invention (I) has a feature, as described above, that (1) it comprises adding a protease having an exopeptidase activity to a natural rubber latex and aging the natural rubber latex, thereby to decompose a protein in the latex to such a degree that the protein and a protein decomposition product, which have a number-average molecular weight of 4500 or more, are not detected. The present invention includes the following embodiments.

(2) The method of preparing a low allergenic natural rubber latex described in the term (1), wherein the protein and the decomposition product thereof in the latex are removed after decomposing the protein.

(3) The method of preparing a low allergenic natural rubber latex described in the term (2), wherein the protein and the decomposition product thereof are removed by a centrifugation treatment.

(4) The method of preparing a low allergenic natural rubber latex described in the term (1), wherein the pH of the latex is adjusted to a neutral range before treating with the protease having an exopeptidase activity.

(5) The method of preparing a low allergenic natural rubber latex described in the term (1), wherein the protease having an exopeptidase activity is produced by microorganisms which belongs to the genus Aspergillus or Rhizopus.

(6) The method of preparing a low allergenic natural rubber latex described in the term (5), wherein the microorganisms which belong to the genus Aspergillus are microorganisms which belong to *Aspergillus oryzae*.

(7) The method of preparing a low allergenic natural rubber latex described in the term (5), wherein the microorganisms which belong to the genus Aspergillus are microorganisms which belong to *Aspergillus mellus*.

(8) The method of preparing a low allergenic natural rubber latex described in the term (5), wherein the microorganisms which belong to the genus Rhizopus are microorganisms which belong to *Rhizopus oryzae*.

(9) The method of preparing a low allergenic natural rubber latex described in the term (1), wherein the decomposition treatment of the protein is carried out in the presence of a surfactant.

The respective constituent features of the present invention will now be described.

[Protease Having an Exopeptidase Activity]

The enzyme for decomposing the protein used in the present invention is a protease having an exopeptidase activity.

In the present invention, the effect of reducing the molecular weight of the protein and the decomposition effect can be further enhanced by the decomposition using an endopeptidase, along with the decomposition using an exopeptidase. It is preferred to use a protease having both an exopeptidase activity and an endopeptidase activity in the preparation method of the present invention.

In case the protease having an exopeptidase activity is limited from its origin, the protease is preferably a protease produced by microorganisms, which belong to the genus Aspergillus or Rhizopus, as a kind of filamentous bacteria.

Examples of the microorganisms which belong to the Aspergillus include *Aspergillus oryzae, Aspergillus mellus, Aspergillus niger, Aspergillus awamori, Aspergillus glaucus, Aspergillus flavus, Aspergillus sojae* and the like.

Examples of the microorganisms which belong to the Rhizopus include *Rhizopus oryzae, Rhizopus javanicus, Rhizopus delemar, Rhizopus nigricants* and the like.

The protease having an exopeptidase activity used in the present invention is preferably a protease produced by microorganisms which belong to *Aspergillus oryzae*, microorganisms which belong to *Aspergillus mellus*, or a protease produced by microorganisms which belong to *Rhizopus oryzae*, among those described above.

Characteristics of a commercially available protease having an exopeptidase activity are shown in Table 2.

TABLE 2

| Filamentous bacteria which produced enzyme | Activity | | | Service |
|---|---|---|---|---|
| Trade name of enzyme | Endo | Exo | pH | temperature (° C.) |
| *Aspergillus oryzae* A "Amano" G*3 | ○ | ○ | 5.4–10 | 46–58 |
| *Aspergillus oryzae* M "Amano"*3 | ○ | ◎ | 3.0–6.2 | 35–62 |

TABLE 2-continued

| Filamentous bacteria which produced enzyme | Activity | | | Service |
|---|---|---|---|---|
| Trade name of enzyme | Endo | Exo | pH | temperature (° C.) |
| *Aspergillus oryzae* Umamizyme*3 | ○ | ◎ | 6.2–8.2 | 30–60 |
| *Aspergillus oryzae* Flavorzyme*2 | ○ | ○ | 4.5–7.7 | 38–58 |
| *Aspergillus mellus* P "Amano" 3G*3 | ○ | ○ | 6.0–9.2 | 37–49 |
| *Aspergillus oryzae* Peptidase R*3 | ○ | ◎ | 6.2–7.4 | 30–50 |

Manufacturer:
1: Kao Corp.,
2: Novo-Nordisk Bioindustri A/S,
3: Amano Enzyme, Inc.,
4: Nagase Biochemicals, Ltd.
Activity:
◎: very high,
○: high,
—: no activity
Regarding the trade name of bacteria which produced an enzyme, the genus is shown in the upper column, while species are shown in the lower column.

(Raw latex)

The natural rubber latex, which is a starting material to obtain the low allergenic natural rubber latex of the present invention, means a latex collected from rubber trees and a flesh field latex and a commercially available ammonia-treated latex can be used as the latex.

[Method of Protein Decomposition Treatment]
[Decomposition Treatment of Protein]

In the preparation method of the present invention, the decomposition treatment of the protein by a protease having an exopeptidase activity is carried out by adding the protease or a mixture of two or more proteases in a natural rubber latex, and aging the latex for about several hours to one week.

The amount of the protease having an exopeptidase activity is set according to the peptidase activity and is not specifically limited, but may be usually set within a range from about 0.001 to 10% by weight based on the rubber solid content of the field latex or ammonia-treated latex. When the amount of the protease is smaller than 0.001% by weight, there is a possibility that the sufficient effect of decomposing the protein is not obtained. On the other hand, when the amount exceeds 10% by weight, the cost increases because of excess enzyme and the enzymatic activity is likely to be reduced.

The peptidase activity of the protease having an exopeptidase activity used in the present invention is not specifically limited, but is preferably 30 u/g or more (LGG method).

The pH of the latex in the protein decomposition treatment by the protease is set according to an optimum pH of the protease to be used. Since almost any protease having an exopeptidase activity is a so-called neutral protease having an optimum pH in a neutral range, specifically within a range from 6 to 9, and preferably from 6.5 to 8.5, the pH of the latex to be treated with the protease is preferably adjusted within a neutral range, specifically within a range from 6 to 9, and preferably from 6.5 to 8.5. To adjust the pH of the latex to a neutral range, sodium dihydrogenphosphate, formalin, diluted hydrochloric acid or the like may be added to the latex.

The temperature of the latex in the protein decomposition treatment by the protease is set according to the optimum temperature of the protease to be used and is not specifically limited, but is preferably set within a range from 5 to 90° C., and more preferably from 20 to 60° C.

The surfactant as a stabilizer may be previously added before the protein decomposition treatment by the protease or added in the amount within a range from 0.01 to 10% by weight during the treatment by the protease.

(Removing treatment of protein and protein decomposition product)

After the completion of the protein decomposition treatment, the natural rubber latex may be further subjected to treatments such as centrifugation, coagulation of the rubber component, ultrafiltration and the like. The protein and the decomposition product thereof can be separated from the rubber component and removed by these treatments. By subjecting to such a removing treatment, a natural rubber latex having a lower allergy can be provided.

In case the removing treatment of the protein and the decomposition product thereof is carried out by centrifugation, the protein and the decomposition product thereof are sufficiently removed by only one centrifugation treatment, but the centrifugation treatment may be carried out twice or more times as far as an adverse influence is exerted by loss of the rubber component and reduction in yield.

[Surfactant]

In case the decomposition treatment of the protein is carried out to prepare a low allergenic natural rubber of the present invention, a surfactant as a stabilizer is preferably added to the latex before subjecting to a treatment by the protease having an exopeptidase activity or during the treatment. In case the pH of the ammonia-treated latex is adjusted to a neutral range or the decomposition treatment of the protein is carried out, the addition of the surfactant is desired to prevent coagulation of the rubber component.

Examples of the surfactant include, but are not limited to, various anionic surfactants, nonionic surfactants and cationic surfactants which have conventionally been known. Since almost any protease having an exopeptidase activity has an optimum pH in a neutral range, preferred are those which exhibit stable surface activity in a neutral range, and preferably pH 6.5 to 8.5.

Surfactants, which can be used in the present invention, are shown below. The following surfactants can be used alone or in combination.

(Anionic surfactant)

Examples of the anionic surfactant include carboxylate, sulfonate, sulfate and phosphate surfactants.

Examples of the carboxylate anionic surfactant include fatty acid salt, polyhydric carboxylic acid salt, rosin acid salt, dimer acid salt, polymer acid salt and tall oil fatty acid salt, which have 6 to 30 carbon atoms. Among these, carboxylic acid salt having 10 to 20 carbon atoms is preferred. When the number of carbon atoms is smaller than 6, the action for dispersion and emulsification of the protein and impurities is likely to be insufficient. On the other hand, when the number of carbon atoms exceeds 30, it is likely to be difficult to disperse in water.

Examples of the sulfonate anionic surfactant include alkylbenzenesulfonic acid salt, alkylnaphthalenesulfonic acid salt, naphthalenesulfonic acid salt and diphenyl ether sulfonic acid salt.

Examples of the sulfate surfactant include alkylsulfuric ester salt, polyoxyalkylene alkylsulfuric ester salt, polyoxyalkylene alkyl phenyl ether sulfuric acid salt, tristyrenated phenol sulfuric ester salt and polyoxyalkylene distyrenated phenol sulfuric ester salt.

Examples of the phosphate anionic surfactant include alkylphosphoric acid ester salt and polyoxyalkylenephosphoric acid ester salt.

Examples of the salt of these compounds include metal salts (for example, Na, K, Ca, Mg and Zn salts), ammonia salt and amine salt (for example, triethanolamine salt).

(Nonionic surfactant)

Examples of the nonionic surfactant include polyoxyalkylene ether, polyoxyalkylene ester, polyhydric alcohol fatty acid ester, saccharide fatty acid ester and alkyl polyglycoside nonionic surfactants.

Examples of the polyoxyalkylene ether nonionic surfactant include polyoxyalkylene alkyl ether, polyoxyalkylene alkyl phenyl ether, polyoxyalkylene polyol alkyl ether, polyoxyalkylene styrenated phenol ether, polyoxyalkylene distyrenated phenol ether and polyoxyalkylene tristyrenated phenol ether. Examples of the polyol include polyhydric alcohol having 2 to 12 carbon atoms, for example, propylene glycol, glycerin, sorbitol, sucrose, pentaerythritol and sorbitan.

Examples of the polyoxyalkylene ester nonionic surfactant include polyoxyalkylene fatty acid ester.

Examples of the polyhydric alcohol fatty acid ester nonionic surfactant include fatty acid ester of polyhydric alcohol having 2 to 12 carbon atoms or fatty acid ester of polyoxyalkylene polyhydric alcohol. Specific examples thereof include sorbitol fatty acid ester, sorbitan fatty acid ester, fatty acid monoglyceride, fatty acid diglyceride and polyglycerin fatty acid ester. Polyalkylene oxide adducts of these surfactants (for example, polyoxyalkylene sorbitan fatty acid ester, polyoxyalkylene glycerin fatty acid ester, etc.) can also be used.

Examples of the saccharide fatty acid ester nonionic surfactant include fatty acid esters of sucrose, glucose, maltose, fructose and polysaccharides, and polyalkylene oxide adducts of these surfactants can also be used.

Examples of the alkyl polyglycoside nonionic surfactant include alkyl glucoside, alkyl polyglucoside, polyoxyalkylene alkyl glucoside and polyoxyalkylene alkyl polyglucoside and fatty acid esters. Polyalkylene oxide adducts of these surfactants can also be used.

Examples of the alkyl group in these nonionic surfactants include alkyl group having 4 to 30 carbon atoms. Examples of the polyoxyalkylene group include those having a $C_{2-4}$ alkylene group, for example, those in which the addition mol number of ethylene oxide is from about 1 to 50 mols. Examples of the fatty acid include straight-chain or branched saturated or unsaturated fatty acid having 4 to 30 carbon atoms.

(Cationic surfactant)

Examples of the cationic surfactant include alkylamine salt, alkylamine derivative and quaternized compound thereof, and imidazolinium salt cationic surfactants.

Examples of the alkylamine salt cationic surfactant include salts of primary amine, secondary amine and tertiary amine.

The alkylamine derivative cationic surfactant has at least one of an ester group, an ether group and an amide group in a molecule and examples thereof include polyoxyalkylene (AO) alkylamine and a salt thereof, alkyl ester amine (including AO adduct) and a salt thereof, alkyl ether amine (including AO adduct) and a salt thereof, alklyamideamine (including AO adduct) and a salt thereof, alkyl ester amideamine (including AO adduct) and a salt thereof, and alkyl ether amideamine (including AO adduct) and a salt thereof.

Examples of the salt include hydrochloride, phosphate, acetate, alkylsulfonic acid ester, alkylbenzenesulfonic acid, alkylnaphthalenesulfonic acid, fatty acid, organic acid, alkylphosphoric acid ester, alkyl ether carboxylic acid, alkylamide ether carboxylic acid, anionic oligomer and anionic polymer. Specific examples of the acetate among the alkylamine derivative cationic surfactant include coconutamine acetate and stearylamine acetate. The alkyl group in the alkylamine salt and alkylamine derivative cationic surfactants usually includes, but is not limited to, straight-chain, branched or Guerbet-shaped alkyl groups having 8 to 22 carbon atoms.

Examples of the quaternized compound of the alkylamine salt and alkylamine derivative cationic surfactants include those prepared by quaternizing the alkylamine salt and alkylamine derivative with methyl chloride, methyl bromide, dimethylsulfuric acid or diethylsulfuric acid. Specific examples thereof include alkyltrimethylammonium halide such as lauryltrimethylammonium halide, cetyltrimethylammonium halide, or stearyltrimethylammonium halide; dialkydimethylammonium halide such as distearyldimethylammonium halide; trialkylmethylammonium halide; dialkylbenzylmethylammonium halide; or alkylbenzyldimethylammonium halide.

Examples of the imidazolinium salt cationic surfactant include 2-heptadecenyl-hydroxylethylimidazoline.

Examples of those which exhibit stable surface activity at the pH within a range from 6.5 to 8.5 among the surfactants described above include polyoxyethylene nonyl phenyl ether as the nonionic surfactant and sodium polyoxyethylene alkyl phenyl ether sulfate as the anionic surfactant.

(Other additives)

In the method of preparing the low allergenic natural rubber latex of the present invention, other additives may be used optionally, in addition to the respective components described above.

These other additives include pH adjustors, for example, phosphate such as monopotassium phosphate, dipotassium phosphate or sodium phosphate; acetate such as potassium acetate or sodium acetate; acids such as sulfuric acid, acetic acid, hydrochloric acid, citric acid and succinic acid, or salts thereof; and ammonia, sodium hydroxide, potassium hydroxide, sodium carbonate, and sodium hydrogencarbonate. Examples thereof include enzymes such as lipase, esterase, amylase, laccase and cellulase. Examples thereof include dispersants such as styrenesulfonic acid copolymer, formalin naphthalenesulfonate condensate, ligninsulfonic acid, polycyclic aromatic sulfonic acid copolymer, homopolymer/copolymer of acrylic acid and maleic anhydride, isobutylene-acrylic acid, and isobutylene-maleic anhydride copolymer.

[Degree of Protein Decomposition Treatment and Allergy]

In the low allergenic natural rubber latex subjected to the protein decomposition treatment by the protease having an exopeptidase activity according to the preparation method of the present invention, the protein is remained in the same amount as that of the natural rubber latex as control in case of comparing by the nitrogen content (N%) by the Kjeldahl's method.

However, the low allergenic natural rubber latex obtained by the method of the present invention has a very small content of the protein having a large molecular weight and the allergenic protein as compared with the deproteinized natural rubber latex subjected to the deproteinization treatment by a conventional method. Specifically, the protein and the protein decomposition product, which have a number-average molecular weight <Mn> of 4500 or more, are not detected from the low allergenic natural rubber latex obtained by the method of the present invention.

As is apparent from Comparative Examples described hereinafter, the protein and the protein decomposition product, which have a number-average molecular weight <Mn> of 4500 or more, are detected from the deproteinized natural rubber latex (rubber solid content: about 30%) subjected to the deproteinization treatment by a conventional method (one enzyme treatment and one centrifugation treatment). On the other hand, as is apparent from Examples described hereinafter, the protein and the protein decomposition product, which have a number-average molecular weight <Mn> of 4500 or more, are not detected from the natural rubber latex subjected to the protein decomposition treatment by the method of the present invention (one enzyme treatment and no centrifugation treatment).

As described above, the degree that the protein and the protein decomposition product, which have a number-average molecular weight <Mn> of 4500 or more, are not detected means that the protein is decomposed to such a degree that allergy caused by the protein does not substantially occur. Regarding the low allergenic natural rubber latex of the present invention, although the total amount of the protein remained in the latex is large, a possibility of causing immediate allergy due to the protein is markedly reduced.

In the case the protein was subjected to the decomposition treatment by the preparation method of the present invention, as described above, the protein and the protein decomposition product, which have a number-average molecular weight of 4500 or more, are not detected. According to more preferred conditions of the present invention, the protein can be decomposed to such a degree that the protein and the protein decomposition product, which have a number-average molecular weight of 2000 or more, more preferably 1500 or more, are not detected.

In the case the protein was subjected to the decomposition treatment by the preparation method of the present invention, the content index of the allergenic protein measured by the RAST-inhibition method can be reduced to 10 $\mu$g/g or less, preferably 5 $\mu$g/g or less, and more preferably 2 $\mu$g/g or less.

It is generally considered that allergy caused by the protein is less likely to occur, substantially, when the content index of the allergenic protein is smaller than 10 $\mu$g/g or less.

As used herein, the term "content index of an allergenic protein" is an index in which the degree of the content of a protein capable of producing an IgE-antibody against human serum (capable of serving as an antigen) is indicated based on a general high ammonia latex (HA latex), and is a value which relatively indicates the degree of allergy.

Although the total amount of the protein in the natural rubber latex and the total amount of the dissolved protein can be determined by analysis, the amount of the allergenic protein and that of non-allergenic protein can not be determined separately. Therefore, allergy of the natural rubber latex is evaluated as a relative value of allergy based on a conventional natural rubber latex, for example, a HA latex herein.

The "content index of an allergenic protein" is calculated by a Competitive RAST-immunoinhibition method [see X. Baur et al., Allergy, 52, 661–664 (1997)] using a Pharmacia Cap system and is specifically calculated in the following procedure.

First, an extract of a HA latex (non-ammonia natural rubber latex in the above literature) as a standard allergenic sample is aged by mixing with an IgE-antibody in human serum, thereby enabling the antigen-antibody reaction between the allergenic protein in the HA latex and the IgE-antibody to proceed. As a supply source of the IgE-antibody, serum of persons suffering from latex allergy is used. The IgE-antibody remained without causing the antigen-antibody reaction is reacted with an Immuno-Cap latex antigen of a solid phase and the immobilized IgE-antibody is bonded with an antibody labeled with an enzyme (β-D-galactosidase), and then the amount of the remained IgE-antibody is determined by measuring the fluorescence intensity. The degree of allergy for the dissolved protein of the HA latex is determined by this measured value. Using several kinds of samples having different dilution degrees of the HA latex, the degree of allergy is measured and a calibration curve is made. Also with respect to the natural rubber latex as a measuring sample, the degree of allergy is determined in the same manner as described above. As a result, if the resulting degree of allergy is the same as that obtained when the total amount of the dissolved protein of the HA latex is 10 µg per 1 µg of the rubber, the content index of the allergenic protein of the measuring sample is 10 µg/g.

B. The method (II) of preparing a deproteinized natural rubber latex of the present invention will be described.

The method of preparing a deproteinized natural rubber latex of the present invention has a feature, as described above, that (10) it comprises adding an alkali protease to a natural rubber latex, thereby to decompose a protein in the latex, adding a protease having an exopeptidase activity, thereby to further decompose the protein and a decomposition product thereof in the latex, and removing the protein and the decomposition product thereof. The present invention includes the following embodiments.

(11) The method of preparing a deproteinized natural rubber latex described in the term (10), wherein the protein and the decomposition product thereof are removed by a centrifugation treatment.

(12) The method of preparing a deproteinized natural rubber latex described in the term (10), wherein the pH of the latex is adjusted to a neutral range before treating with the protease having an exopeptidase activity.

(13) The method of preparing a deproteinized natural rubber latex described in the term (10), wherein the protease having an exopeptidase activity is produced by microorganisms which belong to the genus Aspergillus or Rhizopus.

(14) The method of preparing a deproteinized natural rubber latex described in the term (13), wherein the microorganisms which belong to the genus Aspergillus are microorganisms which belong to *Aspergillus oryzae*.

(15) The method of preparing a deproteinized natural rubber latex described in the term (13), wherein the microorganisms which belong to the genus Aspergillus are microorganisms which belong to *Aspergillus mellus*.

(16) The method of preparing a deproteinized natural rubber latex described in the term (13), wherein the microorganisms which belong to the genus Rhizopus are microorganisms which belong to *Rhizopus oryzae*.

(17) The method of preparing a deproteinized natural rubber latex described in the term (10), wherein the decomposition treatment of the protein is carried out in the presence of a surfactant.

The respective constituent features of the present invention will now be described.

[Protease]

The enzyme for decomposing a protein, which is used to prepare a deproteinized natural rubber of the present invention, includes two kinds of enzymes, such as conventionally known protease (alkali protease) and protease having an exopeptidase activity.

(Conventionally known protease)

The conventionally known protease is not specifically limited, and may be either a protease derived from filamentous bacteria or a protease derived from yeast. Among these proteases, a protease derived from bacteria is preferably used. In general, the protease derived from bacteria is a protease, which has an optimum pH in an alkali range and only has an endoprotease activity.

Specific examples of the protease derived from bacteria include proteases described in Table 1.

(Protease having exopeptidase activity)

The protease having an exopeptidase activity may also have an endopeptidase activity. In this case, the effect of reducing the molecular weight of the protein and the efficiency of the decomposition can be further improved.

As the protease having an exopeptidase activity, the same one described in the preparation method (I) of the present invention can be used.

[Raw latex]

As the natural rubber latex as a starting material for obtaining the deproteinized natural rubber latex of the present invention, the same one described in the preparation method (I) of the present invention can be used.

[Method of Preparing Deproteinized Natural Rubber Latex]

The method of preparing a deproteinized natural rubber latex of the present invention has a feature, as described above, that it comprises the steps of:

(1) performing a decomposition treatment of a protein using a conventionally known protease (alkali protease), and (2) optionally adjusting the pH of a latex and performing a decomposition treatment of a protein using a protease having an exopeptidase activity, and then removing the protein and the decomposition product thereof from the latex thus obtained.

(Decomposition treatment of protein by alkali protease)

In the method of preparing a deproteinized natural rubber of the present invention, the decomposition treatment of the protein by the conventionally known alkali protease, as the step (1), is carried out by adding the alkali protease or a mixture of two or more proteases in a natural rubber latex, and aging the latex for about several hours to one week.

The amount of the alkali protease is set according to the activity of the protease to be used and is not specifically limited, but may be usually set within a range from about 0.001 to 10% by weight based on the field latex or ammonia-treated latex. When the amount of the alkali protease is smaller than 0.001% by weight, there is a possibility that the sufficient effect of decomposing the protein is not obtained. On the other hand, when the amount exceeds 10% by weight, the cost increases because of excess enzyme and the enzymatic activity is likely to be reduced.

The activity of the alkali protease used in the present invention is not specifically limited.

The pH of the latex in the protein decomposition treatment by the alkali protease may be appropriately set according to an optimum pH of the protease to be used.

The temperature of the latex in the protein decomposition treatment by the alkali protease is set according to the optimum temperature of the protease to be used and is not specifically limited, but is preferably set within a range from 5 to 90° C., and more preferably from 20 to 60° C.

The surfactant as a stabilizer may be previously added before the protein decomposition treatment by the alkali protease or added in the amount within a range from 0.01 to 10% by weight during the treatment by the protease.

(Decomposition treatment of protein by exopeptidase)

The decomposition treatment of the protein by the protease having an exopeptidase activity, as the step (2), is carried out by adding the protease having an exopeptidase activity or a mixture of two or more proteases in a natural rubber latex, and aging the latex for about several hours to one week. This decomposition treatment can be carried out in the same manner as in the preparation method (I) of the present invention.

(Removing treatment of protein and protein decomposition product)

After the completion of the protein decomposition treatment, the natural rubber latex may be further subjected to treatments such as centrifugation, coagulation of the rubber component, ultrafiltration and the like. The protein and the decomposition product thereof can be separated from the rubber component and removed by these treatments. By subjecting to such a removing treatment, a deproteinized natural rubber latex having very low allergy can be provided.

Although the removing treatment may be carried out after the decomposition treatment of the protein by the alkali protease, as the step (1), and after the decomposition treatment of the protein by the protease having an exopeptidase activity, as the step (2), it is preferably carried out only after the decomposition treatment of the protein by the protease having an exopeptidase activity as the step (2) in view of the yield of the deproteinized natural rubber latex and the operation efficiency of the deproteinization treatment.

In case the removing treatment of the protein and the decomposition product thereof is carried out by centrifugation, the protein and the decomposition product thereof are sufficiently removed by only one centrifugation treatment, but the centrifugation treatment may be carried out twice or more times as far as an adverse influence is exerted by loss of the rubber component and reduction in yield.

[Surfactant]

In the method of preparing a deproteinized natural rubber of the present invention, a surfactant as a stabilizer is preferably added to the latex before subjecting to the decomposition treatment of the protein or during the treatment. In case the pH of the ammonia-treated latex is adjusted to a neutral range or the decomposition treatment of the protein is carried out, the addition of the surfactant is desired to prevent coagulation of the rubber component.

Examples of the surfactant include, but are not limited to, various anionic surfactants, nonionic surfactants and cationic surfactants, which have conventionally been known. Since almost any protease having an exopeptidase activity has an optimum pH in a neutral range, preferred are those which exhibit stable surface activity in a neutral range, specifically pH 6 to 9, and preferably pH 6.5 to 8.5.

Examples of the surfactants, which can be used in the present invention include the same anionic surfactants, nonionic surfactants and cationic surfactants as described in the preparation method (I) of the present invention. These surfactants can be used alone or in combination.

(Other additives)

In the method of preparing the deproteinized natural rubber latex of the present invention, other additives may be incorporated optionally similar to the preparation method (I) of the present invention, in addition to the respective components described above.

[Degree of Protein Decomposition Treatment and Allergy]

In the case the protein was subjected to the decomposition treatment by the preparation method of the present invention, as described above, the protein and the protein decomposition product, which have a number-average molecular weight of 4500 or more, are not detected. According to more preferred conditions of the present invention, the protein can be decomposed to such a degree that the protein and the protein decomposition product, which have a number-average molecular weight of 2000 or more, more preferably 1500 or more, are not detected.

In the case the protein was subjected to the decomposition treatment by the preparation method of the present invention, the content index of the allergenic protein measured by the RAST-inhibition method can be reduced to 10 $\mu g/g$ or less, preferably 5 $\mu g/g$ or less, and more preferably 2 $\mu g/g$ or less. As described in the term A, it is generally considered that allergy caused by the protein is less likely to occur, substantially, when the content index of the allergenic protein is smaller than 10 $\mu g/g$ or less.

C. The method (III) of preparing a low allergenic natural rubber latex of the present invention will be described.

The low allergenic natural rubber of the present invention has a feature, as described above, that (18) it is a natural rubber obtained by a decomposition treatment of a protein, wherein the protein and a protein decomposition product, which have a number-average molecular weight <Mn> of 4500 or more, are not detected. The present invention includes the following embodiments.

(19) The low allergenic natural rubber described in the term (18), wherein a protein and a protein decomposition product, which have a number-average molecular weight of 2000 or more, and preferably 1500 or more, are not detected.

(20) The low allergenic natural rubber described in the term (18), wherein a content index of an allergenic protein capable of producing an IgE-class antibody in a human blood serum is 10 $\mu g/g$ or less.

(21) The low allergenic natural rubber described in the term (20), wherein the content index of the allergenic protein is 5 $\mu g/g$ or less.

In the present invention, in case the protein is subjected to the decomposition treatment to such a degree that the protein and the protein decomposition product, which have a number-average molecular weight <Mn> of 4500 or more, are not detected, as described above, it is presumed that the portion, which can serve as an antigen capable of producing an IgE-antibody against human serum, is sufficiently decomposed or denatured. It is considered that allergy caused by the protein is less likely to occur when the content of the allergenic protein is 10 $\mu g$ or less per 1 g of a crude rubber as described above.

It can be said that the deproteinized natural rubber having very small content index of the allergenic protein of the present invention substantially contains no allergen formed by the protein.

The low allergenic natural rubber of the present invention is obtained by performing a decomposition treatment of a protein by using a protease having an exopeptidase activity in place of a conventionally used protease (proteolytic enzyme).

The low allergenic natural rubber of the present invention has a feature that it is obtained by performing a decomposition treatment of a protein by a protease having an exopeptidase activity. Surprisingly, the protein can be decomposed to such a degree that the protein and the protein decomposition product, which have a number-average molecular weight <Mn> of 4500 or more, do not substantially exist by performing a treatment using the protease.

[Method of Preparing Low Allergenic Natural Rubber Latex]

The low allergenic natural rubber latex of the present invention is obtained by adding a protease having an exopeptidase activity or a mixture of two or more proteases in a natural rubber latex, aging the latex for several hours to about one week, and decomposing the protein in the latex.

More specifically, a protease having an exopeptidase activity is added in the amount of about 0.001 to 10% by weight based on the rubber solid content of the natural rubber latex, and then the latex is aged at 5 to 90° C., preferably 20 to 60° C., for several hours to about one week. The decomposition treatment of the protein may be carried out twice or more times, if necessary.

In the case the protease having an exopeptidase activity is added, it is preferred to previously adjust the pH of the latex to a neutral range, specifically pH 6 to 9, and more preferably pH 6.5 to 8.5, in consideration of the fact that almost any protease has an optimum pH in a neutral range (specifically pH 6 to 9) as described hereinafter. To adjust the pH of the latex to the neutral range, sodium dihydrogenphosphate, formalin, diluted hydrochloric acid or the like may be added.

The latex subjected to the decomposition treatment of the protein may be optionally subjected to a purification treatment (removing treatment) by centrifugation, ultrafiltration of the like. In case the purification treatment (removing treatment) by centrifugation is carried out, centrifugation may be carried out by a conventional method after adding the surfactant in the amount within a range from 0.01 to 10% by weight. Although the removing treatment is sufficiently carried out by only one centrifugation treatment, the centrifugation treatment may be carried out twice or more times to enhance the effect of removing the protein and the decomposition product thereof. Then, the rubber component is treated by a conventional method such as coagulation, drying and the like to obtain a deproteinized natural rubber.

The coagulation method includes acid coagulation which is generally carried out, and further salt coagulation, alcohol addition coagulation or freeze-drying and so on. Among these methods, acid coagulation is more preferable for large scale production since the efficiency is highest and the influence on properties of the resulting rubber is less.

[Raw Latex]

As the natural rubber latex as a starting material for obtaining the deproteinized natural rubber latex of the present invention, the same one described in the preparation method (I) of the present invention can be used.

(Protease having exopeptidase activity)

The protease having an exopeptidase activity may also have an endopeptidase activity. In this case, the effect of reducing the molecular weight of the protein and the efficiency of the decomposition can be further improved. Accordingly, in order to prepare a low allergenic natural rubber of the present invention, a protease having both an exoprotease activity and an endopeptidase activity is preferably used.

As the protease having an exopeptidase activity, the same one described in the preparation method (I) of the present invention can be used.

In the protein decomposition treatment for obtaining the low allergenic natural rubber of the present invention, a protein decomposition treatment by a protease having an exopeptidase activity may be used in combination with a protein decomposition treatment by other proteases.

The other protease is not specifically limited, and examples thereof include various conventionally been known peptidases such as protease derived from filamentous bacteria (excluding protease having an exopeptidase activity) and protease derived from yeast shown in Table 1.

[Surfactant]

In the case the decomposition treatment of the protein is carried out to prepare a deproteinized natural rubber of the present invention, a surfactant as a stabilizer is preferably added to the latex before subjecting to the decomposition treatment of the protein or during the treatment. In the case the pH of the ammonia-treated latex is adjusted to a neutral range or the decomposition treatment of the protein is carried out, the addition of the surfactant is desired to prevent coagulation of the rubber component.

Examples of the surfactant include, but are not limited to, various anionic surfactants, nonionic surfactants and cationic surfactants which have conventionally been known. Since almost any protease having an exopeptidase activity has an optimum pH in a neutral range, preferred are those which exhibit stable surface activity in a neutral range, specifically pH 6 to 9, and preferably pH 6.5 to 8.5.

Examples of the surfactants, which can be used in the present invention include the same anionic surfactants, nonionic surfactants and cationic surfactants as described in the preparation method (I) of the present invention. These surfactants can be used alone or in combination.

(Other additives)

In the method of preparing the deproteinized natural rubber latex of the present invention, other additives may be incorporated optionally similar to the preparation method (I) of the present invention, in addition to the respective components described above.

[Amount of Remained Protein of Natural Rubber and Allergy]

In the low allergenic natural rubber latex (III) of the present invention, the protein is remained in the same amount as that of the natural rubber latex as control in case of comparing by the nitrogen content (N%) by the Kjeldahl's method.

However, the low allergenic natural rubber latex of the present invention has a very small content of the protein having a large molecular weight and the allergenic protein as compared with the deproteinized natural rubber latex subjected to the deproteinization treatment by a conventional method. Specifically, the protein and the protein decomposition product, which have a number-average molecular weight <Mn> of 4500 or more, are not detected from the low allergenic natural rubber latex obtained by the method of the present invention.

As is apparent from Comparative Examples described hereinafter, the protein and the protein decomposition product, which have a number-average molecular weight <Mn> of 4500 or more, are detected from the deproteinized natural rubber latex subjected to the deproteinization treatment by a conventional method (one enzyme treatment and one centrifugation treatment). On the other hand, as is apparent from Examples described hereinafter, the protein and the protein decomposition product, which have a number-average molecular weight <Mn> of 4500 or more, are not detected from the natural rubber latex subjected to the protein decomposition treatment by the method of the present invention (one enzyme treatment and no centrifugation treatment).

As described above, the degree that the protein and the protein decomposition product, which have a number-average molecular weight <Mn> of 4500 or more, are not detected means that the protein is decomposed to such a degree that allergy caused by the protein does not substantially occur. Regarding the low allergenic natural rubber latex of the present invention, although the total amount of the protein remained in the latex is large, a possibility of causing immediate allergy due to the protein is markedly reduced.

D. The method (IV) of preparing a deproteinized natural rubber latex of the present invention will be described.

The deproteinized natural rubber (IV) of the present invention has a feature, as described above, that (22) it is a natural rubber obtained by a decomposition treatment and a removing treatment of a protein, wherein the content of the protein is 0.02% or less in terms of a nitrogen content, an absorption at 3280 cm$^{-1}$ is not recognized in an infrared absorption spectrum, and the protein and a protein decomposition product, which have a number-average molecular weight <Mn> of 4500 or more, are not detected. The present invention includes the following embodiments.

(23) The deproteinized natural rubber described in the term (22), wherein a protein and a protein decomposition product, which have a number-average molecular weight of 2000 or more, and preferably 1500 or more, are not detected.

(24) The deproteinized natural rubber described in the term (22), wherein a content index of an allergenic protein capable of producing an IgE-class antibody in a human serum is 10 μg/g or less.

(25) The deproteinized natural rubber described in the term (22), wherein the content index of the allergenic protein is 5 μg/g or less.

In the case the protein is subjected to the decomposition treatment to such a degree that the protein and the protein decomposition product, which have a number-average molecular weight <Mn> of 4500 or more, are not detected, as described above, it is presumed that the portion, which can serve as an antigen capable of producing an IgE-antibody against human serum, is sufficiently decomposed or denatured. It is considered that allergy caused by the protein is less likely to occur when the content of the allergenic protein is 10 μg or less per 1 g of a crude rubber as described above.

It can be said that the deproteinized natural rubber having very small content index of the allergenic protein of the present invention substantially contains no allergen formed by the protein.

The deproteinized natural rubber of the present invention is obtained by performing a decomposition treatment of a protein by a protease having an exopeptidase activity, along with a decomposition treatment of a protein by a conventionally used protease (proteolytic enzyme), and performing a removing treatment of the protein and the decomposition product thereof.

The deproteinized natural rubber of the present invention has a feature that it is obtained by performing a decomposition treatment of a protein by a protease having an exopeptidase activity, in addition to a decomposition treatment of a protein by a conventionally used protease (proteolytic enzyme), and performing a removing treatment of the protein and the decomposition product thereof. Surprisingly, the protein can be decomposed to such a degree that the protein and the protein decomposition product, which have a number-average molecular weight of 4500 or more, do not substantially exist by performing a treatment using the protease.

[Method of Preparing Deproteinized Natural Rubber Latex]

The deproteinized natural rubber latex of the present invention is obtained by the steps of:

(1) subjecting a natural rubber latex to a decomposition treatment of a protein using a conventionally known protease (alkali protease), (2) optionally adjusting the pH of the latex to a neutral range and performing a decomposition treatment of a protein using a protease having an exopeptidase activity, and (3) removing the protein and the decomposition product thereof from the latex thus obtained, and coagulating the rubber component.

The deproteinized natural rubber can be obtained in the following procedure. First, a conventionally known alkali protease is added in the amount of about 0.001 to 10% by weight based on the rubber solid content of the natural rubber latex, and then the protein decomposition treatment is carried out by aging at 5 to 90° C., preferably 20 to 60° C., for several hours to about one week. After 0.01 to 10% by weight of a surfactant was optionally added, a protease having an exopeptidase activity is added is added in the amount of about 0.001 to 10% by weight based on the rubber solid content of the latex, and then the protein decomposition treatment is carried out by aging at 5 to 90° C., preferably 20 to 60° C., for several hours to about one week.

In the case the protease having an exopeptidase activity is added, it is preferred to previously adjust the pH of the latex to a neutral range, specifically pH 6 to 9, and more preferably pH 6.5 to 8.5, in consideration of the fact that almost any protease has an optimum pH in a neutral range (specifically pH 6 to 9) as described hereinafter. To adjust the pH of the latex to the neutral range, sodium dihydrogenphosphate, formalin, diluted hydrochloric acid or the like may be added.

In the case the removing treatment is carried out by centrifugation, centrifugation may be carried out by a conventional method after adding the surfactant in the amount within a range from 0.01 to 10% by weight. Although the removing treatment is sufficiently carried out by only one centrifugation treatment, the centrifugation treatment may be carried out twice or more times to enhance the effect of removing the protein and the decomposition product thereof. Then, the rubber component is treated by a conventional method such as coagulation, drying and the like to obtain a deproteinized natural rubber.

The coagulation method includes acid coagulation which is generally carried out, and further salt coagulation, alcohol addition coagulation or freeze-drying and so on. Among these methods, acid coagulation is more preferable for large scale production since the efficiency is highest and the influence on properties of the resulting rubber is less.

[Raw Latex]

As the natural rubber latex as a starting material for obtaining the deproteinized natural rubber latex of the present invention, the same one described in the preparation method (I) of the present invention can be used.

[Protease]

The enzyme for decomposing a protein, which is used to prepare a deproteinized natural rubber of the present invention, includes two kinds of enzymes, such as a conventionally known protease (alkali protease) and a protease having an exopeptidase activity.

(Conventionally known protease)

The conventionally known protease is not specifically limited, and may be either a protease derived from filamentous bacteria or a protease derived from yeast. Among these proteases, a protease derived from bacteria is preferably used. In general, the protease derived from bacteria is a protease, which has an optimum pH in an alkali range and only has an endoprotease activity.

Specific examples of the protease derived from bacteria include proteases described in Table 1.

(Protease having exopeptidase activity)

The protease having an exopeptidase activity may also have an endopeptidase activity. In this case, the effect of reducing the molecular weight of the protein and the efficiency of the decomposition can be further improved.

When the protease having an exopeptidase activity is limited by its origin, as described above, the protease is preferably produced by microorganisms, which belong to the genus Aspergillus or Rhizopus, as a kind of filamentous bacteria. As the microorganisms, which belong to the genus Aspergillus, the same one described in the preparation method (I) of the present invention can be used.

[Surfactant]

In case the decomposition treatment of the protein is carried out to prepare a deproteinized natural rubber of the present invention, a surfactant as a stabilizer is preferably added to the latex before subjecting to the decomposition treatment of the protein or during the treatment. In case the pH of the ammonia-treated latex is adjusted to a neutral range or the decomposition treatment of the protein is carried out, the addition of the surfactant is desired to prevent coagulation of the rubber component.

Examples of the surfactant include, but are not limited to, various anionic surfactants, nonionic surfactants and cationic surfactants which have conventionally been known. Since almost any protease having an exopeptidase activity has an optimum pH in a neutral range (specifically pH 6 to 9), preferred are those which exhibit stable surface activity in a neutral range, specifically pH 6 to 9, and preferably pH 6.5 to 8.5.

Examples of the surfactants, which can be used in the present invention include the same anionic surfactants, nonionic surfactants and cationic surfactants as described in the preparation method (I) of the present invention. These surfactants can be used alone or in combination.

(Other additives)

In the method of preparing the deproteinized natural rubber latex of the present invention, other additives may be incorporated optionally similar to the preparation method (I) of the present invention, in addition to the respective components described above.

EXAMPLES

The following Examples and Comparative Examples further illustrate the present invention, but the present invention is not limited by the following Examples.

In the following Examples and Comparative Examples, a field latex produced in Malaysia or a high ammonia natural rubber latex [rubber solid content: 60.2% by weight, ammonia content: 0.7%] manufactured by Soctex Co. (Malaysia) was used.

As the surfactant, a nonionic surfactant manufactured by Toho Chemical Industry Co., Ltd. under the trade name of "Triton X-100" was used.

[Preparation of Low Allergenic Natural Rubber Latex]

Example 1

(Only protein decomposition treatment)

To 100 parts by weight of a rubber content of a field latex, 1.0 parts by weight of a nonionic surfactant and 0.12% of sodium naphthenate were added, thereby to stabilize the latex, and then the pH of the latex was adjusted to 7.0 by using an aqueous 5% sodium dihydrogenphosphate solution. To 100 parts by weight of the rubber content of this latex, 0.1 parts by weight of a protease having an exopeptidase activity was added, and then the latex was aged by allowing to stand at 30° C. for 24 hours to obtain a low allergenic natural rubber latex which has been subjected to a protein decomposition treatment.

As the protease, a protease, which has both an exopeptidase activity and an endopeptidase activity and an optimum pH in a neutral range, and is also produced by microorganisms which belong to Aspergillus oryzae [manufactured by Amano Enzyme, Inc. under the trade name of "Umamizyme"], was used (see Table 2). This protease had a peptidase activity of 70 u/g or more (pH 7.0, LGG (L-Leucyl-Glycyl-Glycine) method).

(Protein decomposition treatment and protein removing treatment)

The low allergenic natural rubber latex which has been subjected to the protein decomposition treatment was diluted with an aqueous 1% solution of a nonionic surfactant, thereby to reduce the rubber content of the latex to 10%, and then subjected to a centrifugation treatment at 13000 rpm for 30 minutes. The cream component thus separated in the upper layer was taken out and then dispersed again in the same amount of water to obtain a low allergenic natural rubber latex which has been subjected to a protein decomposition treatment and a protein removing treatment.

Example 2

(Only protein decomposition treatment)

A high ammonia latex (hereinafter referred to as a "HA latex") was diluted so that the rubber content is reduced to 30% by weight. To 100 parts by weight of a rubber content of the latex, 1.0 parts by weight of a nonionic surfactant and 0.12% of sodium naphthenate (stabilizer) were added, thereby to stabilize the latex, and then the pH of the latex was adjusted to 7.0 by using an aqueous 5% sodium dihydrogenphosphate solution. To 100 parts by weight of the rubber content of this latex, 0.1 parts by weight of a protease (aforementioned "Umamizyme") was added, and then the latex was aged by allowing to stand at 30° C. for 24 hours to obtain a low allergenic natural rubber latex which has been subjected to a protein decomposition treatment.

(Protein decomposition treatment and protein removing treatment)

The low allergenic natural rubber latex which has been subjected to the protein decomposition treatment was diluted with an aqueous 1% solution of a nonionic surfactant, thereby to reduce the rubber content of the latex to 10%, and then subjected to a centrifugation treatment at 13000 rpm for 30 minutes. The cream component thus separated in the upper layer was taken out and then dispersed again in the same amount of water to obtain a low allergenic natural rubber latex which has been subjected to a protein decomposition treatment and a protein removing treatment.

Example 3

(Only protein decomposition treatment)

In the same manner as in Example 1 (namely, the field latex is used as a starting material), except that a protease produced by microorganisms which belong to Aspergillus mellus [manufactured by Amano Enzyme, Inc. under the trade name of P "Amano" 3G] was used as the protease having an exopeptidase activity in place of aforementioned "Umamizyme" and that the amount was changed to 0.1 parts by weight based on 100 parts by weight of the rubber content of the latex, the decomposition treatment of the protein was carried out to obtain a low allergenic natural rubber latex.

The protease P "Amano" 3G is a protease, which has a protein digestion potency of 10000 u/g or more (pH 7.0, Amano method) and has both an exopeptidase activity and an endopeptidase activity and also has an optimum pH in a neutral range as shown in Table 2.

(Protein decomposition treatment and protein removing treatment)

In the same manner as in Example 1, the low allergenic natural rubber latex which has been subjected to the protein decomposition treatment was subjected to the dilution treatment, the centrifugation treatment and the redispersion treatment to obtain a low allergenic natural rubber latex which has been subjected to a protein decomposition treatment and a protein removing treatment.

Example 4

(Only protein decomposition treatment)

In the same manner as in Example 2 (namely, the HA latex is used as a starting material), except that aforementioned P "Amano" 3G was used as the protease having an exopeptidase activity in place of aforementioned "Umamizyme" and that the amount was changed to 0.1 parts by weight based on 100 parts by weight of the rubber content of the latex, the decomposition treatment of the protein was carried out to obtain a low allergenic natural rubber latex.

(Protein decomposition treatment and protein removing treatment)

In the same manner as in Example 2, the low allergenic natural rubber latex which has been subjected to the protein decomposition treatment was subjected to the dilution treatment, the centrifugation treatment and the redispersion treatment to obtain a low allergenic natural rubber latex which has been subjected to a protein decomposition treatment and a protein removing treatment.

Example 5

(Only protein decomposition treatment)

In the same manner as in Example 1 (namely, the field latex is used as a starting material), except that a protease produced by microorganisms which belong to *Rhizopus oryzae* [manufactured by Amano Enzyme, Inc. under the trade name of "Peptidase R"] was used as the protease having an exopeptidase activity in place of aforementioned "Umamizyme" and that the amount was changed to 0.1 parts by weight based on 100 parts by weight of the rubber content of the latex, the decomposition treatment of the protein was carried out to obtain a low allergenic natural rubber latex.

The protease "Peptidase R" is a protease, which has a peptidase activity of 420 u/g or more (pH 7.0, LGG method) and has both an exopeptidase activity and an endopeptidase activity and also has an optimum pH in a neutral range as shown in Table 2.

(Protein decomposition treatment and protein removing treatment)

In the same manner as in Example 1, the low allergenic natural rubber latex which has been subjected to the protein decomposition treatment was subjected to the dilution treatment, the centrifugation treatment and the redispersion treatment to obtain a low allergenic natural rubber latex which has been subjected to a protein decomposition treatment and a protein removing treatment.

Example 6

(Only protein decomposition treatment)

In the same manner as in Example 2 (namely, the HA latex is used as a starting material), except that aforementioned "Peptidase R" was used as the protease having an exopeptidase activity in place of aforementioned "Umamizyme" and that the amount was changed to 0.1 parts by weight based on 100 parts by weight of the rubber content of the latex, the decomposition treatment of the protein was carried out to obtain a low allergenic natural rubber latex.

(Protein decomposition treatment and protein removing treatment)

In the same manner as in Example 2, the low allergenic natural rubber latex which has been subjected to the protein decomposition treatment was subjected to the dilution treatment, the centrifugation treatment and the redispersion treatment to obtain a low allergenic natural rubber latex which has been subjected to a protein decomposition treatment and a protein removing treatment.

Comparative Example 1

(Only protein decomposition treatment)

To 100 parts by weight of a rubber content of a field latex, 0.1 parts by weight of an alkali protease, 1.0 parts by weight of a nonionic surfactant and 0.12% of sodium naphthenate were added, thereby to stabilize the latex.

As the alkali protease, a protease, which is derived from bacteria and is also produced by microorganisms which belong to *Bacillus licheniformis* [manufactured by Novo-Nordisk Bioindustri A/S under the trade name of "Alcalase 2.0M"], was used. This alkali protease had a potency of 2.0 AU/g (pH 8.3) and has an optimum pH in an alkali range, as shown in Table 1, and also has an endopeptidase but has no exopeptidase activity.

After adjusting the pH to 9.2 by using sodium dihydrogenphosphate, the latex was aged by allowing to stand at 30° C. for 24 hours to obtain a natural rubber latex which has been subjected to a protein decomposition treatment.

(Protein decomposition treatment and protein removing treatment)

The low allergenic natural rubber latex which has been subjected to the protein decomposition treatment was diluted with an aqueous 1% solution of a nonionic surfactant, thereby to reduce the rubber content of the latex to 10%, and then subjected to a centrifugation treatment at 13000 rpm for 30 minutes. The cream component thus separated in the upper layer was taken out and then dispersed again in the same amount of water to obtain a natural rubber latex which has been subjected to a protein decomposition treatment and a protein removing treatment.

[Evaluation of Protein Decomposition Treatment]

(Measurement of nitrogen content)

Using each of latexes prepared by dispersing again a cream component formed after the centrifugation in water in Examples 1 to 6 and Comparative Example 1, and the latex was spread over a glass plate to obtain a cast film.

These cast films were used as samples for measuring the nitrogen content.

With respect to Example 1 and Comparative Example 1, same cast films as those described above were made by using latexes subjected only to the protein decomposition treatment and these films were used as samples for measuring the nitrogen content.

Furthermore, cast films were made directly from the field latex and HA latex, which has been subjected to neither protein decomposition treatment nor washing treatment, and these films were used as samples of control.

With respect to respective samples of Examples 1 to 6, Comparative Example 1 and control, the nitrogen content (N%) was measured by a RRIM test method (Rubber Research Institute of Malaysia (1973). 'SMR Bulletin No. 7').

The measurement results of the nitrogen content (N%) are shown in Table 3.

(Measurement of content index of allergenic protein)

According to a RAST-inhibition method, a content index of an allergenic protein contained in each of the natural rubber latexes obtained in Examples 1 to 6 and Comparative Example 1 was measured. The "content index of the allergenic protein" was measured by a Competitive immunoinhibition method using aforementioned Pharmacia Cap system in Deutsche BGFA (Berufsgenossenschaftliches Forschungsinstitut für Arbeitsmedizin).

In Example 1 and Comparative Example 1, the content index of the allergenic protein was calculated in the same manner, also with respect to the latex which has been subjected only to the protein decomposition treatment.

The measurement results of the content index of the allergenic protein are shown in Table 3.

Figure 2:
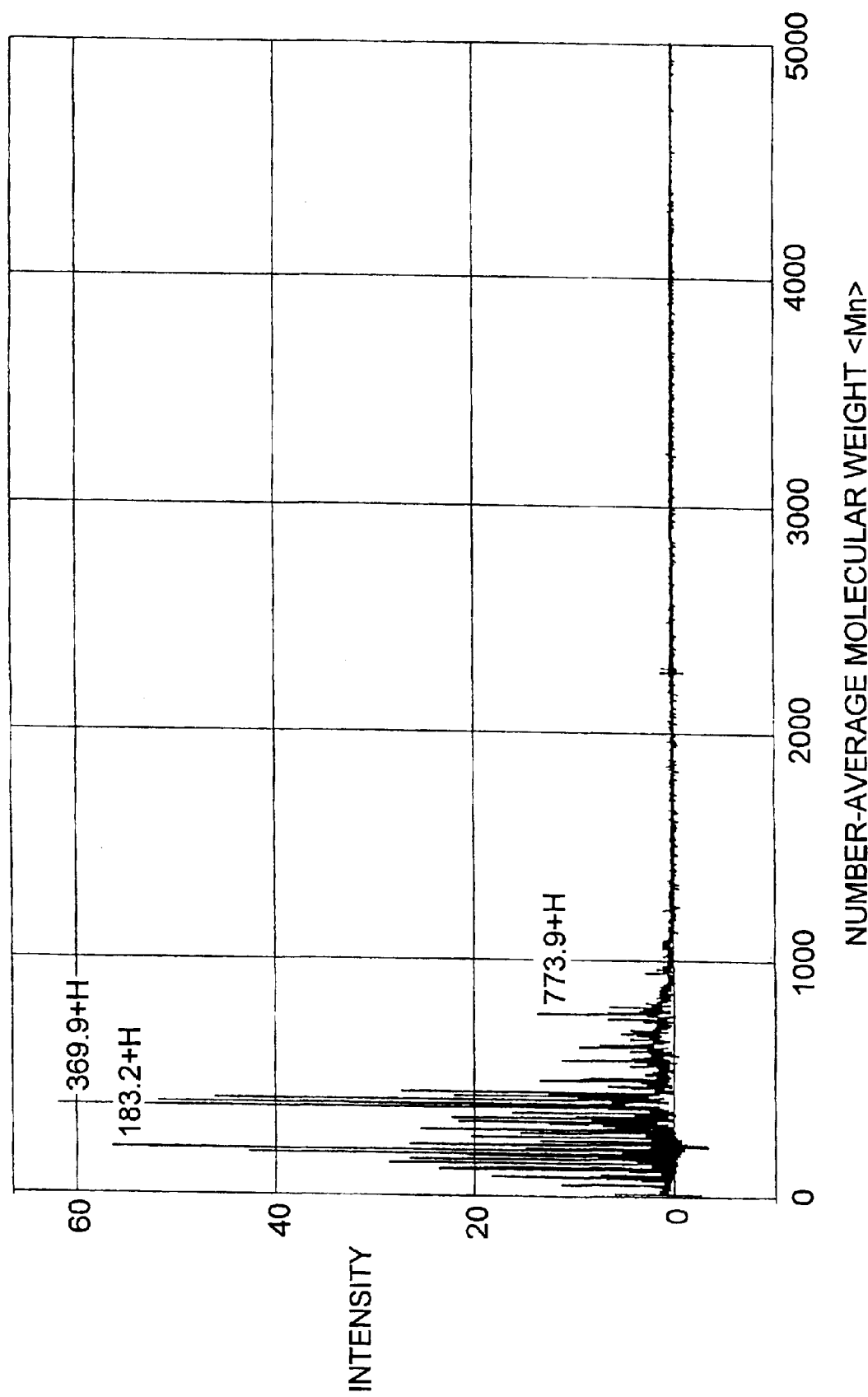
FIG. 2 is a graph showing the measurement results of a number-average molecular weight <Mn> of the remained protein and protein decomposition product with respect to low allergenic natural rubber latexes obtained in Examples 1 and 13 which have been subjected to a protein decomposition treatment and a protein removing treatment.

With respect to the analysis results of the number-average molecular weight <Mn> about the remained protein and protein decomposition product, the measurement results of samples of Example 1 obtained from the low allergenic natural rubber latex subjected only to the protein decomposition treatment are shown in FIG. 1, the measurement results of samples of Example 1 obtained from the low allergenic natural rubber latex which has been subjected to the protein decomposition treatment and the protein removing treatment are shown in FIG. 2, and the measurement results of samples of Comparative Example 1 obtained from

TABLE 3

| Kinds of latex | | Protease | | Protein removing treatment | Nitrogen content (N %) | Content index of allergenic protein |
|---|---|---|---|---|---|---|
| | Kind | Kind | Amount*1 (parts by weight) | | | |
| Example 1 | Field latex | Umamizyme | 0.1 | no | 0.643 | 356 µg/g |
| | | | | yes | 0.062 | 4.3 µg/g |
| Example 2 | HA latex | Umamizyme | 0.1 | yes | 0.041 | 2.6 µg/g |
| Example 3 | Field latex | P "Amano" 3G | 0.1 | yes | 0.061 | 3.9 µg/g |
| Example 4 | HA latex | P "Amano" 3G | 0.1 | yes | 0.042 | 2.5 µg/g |
| Example 5 | Field latex | Peptidase R | 0.1 | yes | 0.062 | 3.7 µg/g |
| Example 6 | HA latex | Peptidase R | 0.1 | yes | 0.042 | 2.3 µg/g |
| Comp. Example 1 | Field latex | Alcalase 2.0M | 0.1 | no | 0.645 | 982 µg/g |
| | | | | yes | 0.062 | 21.1 µg/g |
| Control 1 | Field latex | — | — | yes*2 | 0.654 | >8000 µg/g |
| Control 2 | HA latex | | — | yes*2 | 0.334 | 1060 µg/g |

*1: Amount (parts by weight) of protease is a value based on 100 parts by weight of the rubber content of the latex.
*2: Protein is merely removed by concentration.

As is apparent from Table 3, although the low allergenic natural rubber latex of Example 1 has the same nitrogen content (N%) as that of the deproteinized natural rubber latex of Comparative Example 1 obtained by a conventional treatment using an enzyme, the content index of the allergenic protein was markedly reduced.

In Example 1, the content index of the allergenic protein was markedly reduced as compared with a conventional HA latex shown in control 2 even when subjected only to an enzyme treatment, and also reduced as compared with that which has been subjected to a conventional enzyme treatment (latex of Comparative Example 1 which has not been subjected to a protein removing treatment).

Therefore, it has been found that a possibility of causing allergy due to the protein is markedly reduced.

(Analysis of molecular weight of protein)

With respect to the natural rubber latexes obtained in Example 1 and Comparative Example 1, it was analyzed whether or not impurities having a number-average molecular weight <Mn> within a range from 4500 to 4700 exist, using an analysis system of a protein, comprising a combination of a time of flight (TOF) type mass spectrometer and a two-dimensional surface decorative chip [for example, protein structure analyzer "Protein Chip™ System", manufactured by Ciphergen Biosystems, Inc.].

Figure 3:
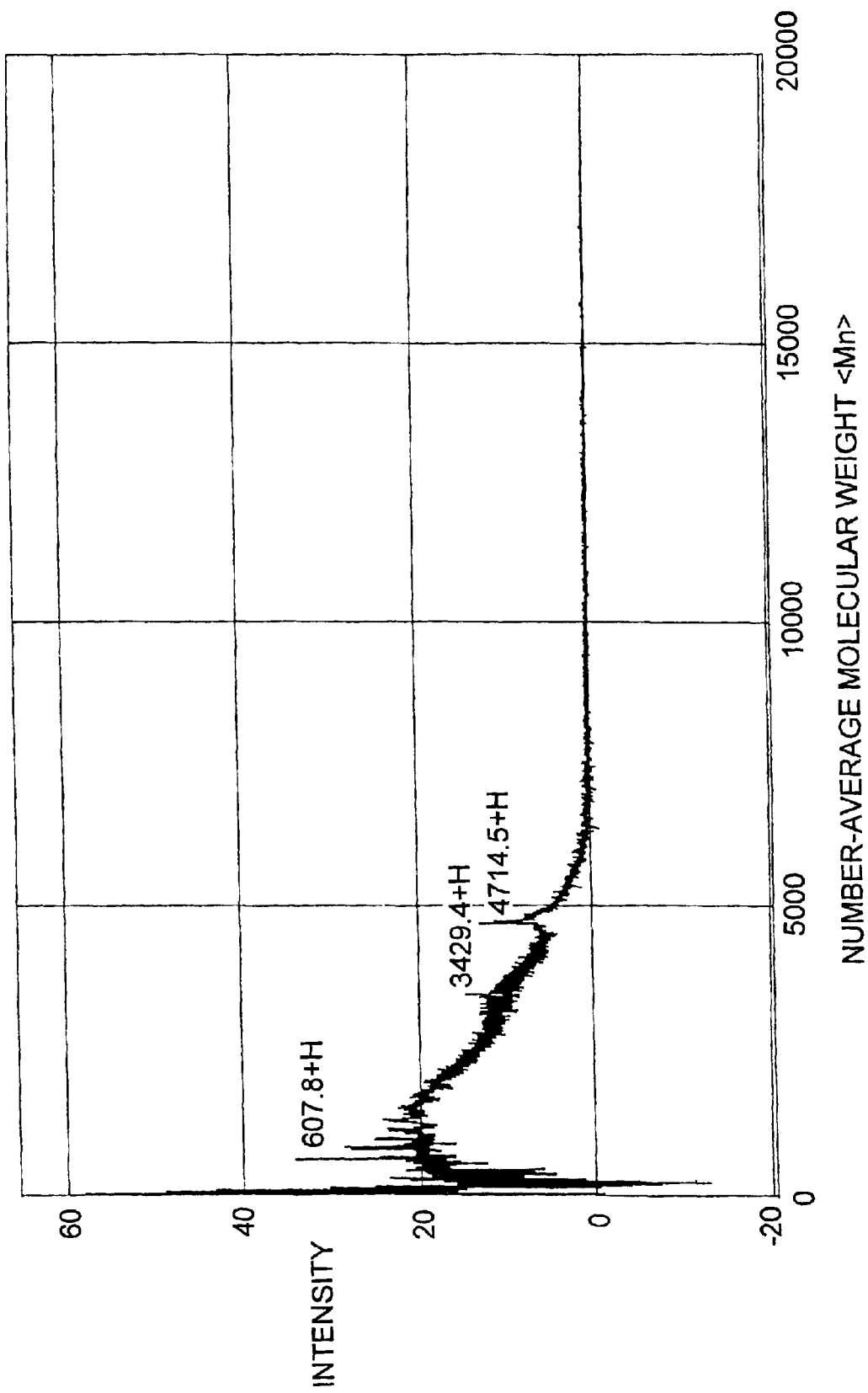
FIG. 3 is a graph showing the measurement results of a number-average molecular weight <Mn> of the remained protein and protein decomposition product with respect to deproteinized natural rubber latexes obtained in Comparative Examples 1 and 3, and Comparative Examples 2 and 4 which have been subjected to a protein decomposition treatment and a protein removing treatment.

The analysis of the molecular weight of the protein by the above "Protein Chip™ System" was carried out in the following procedure. (1) First, a sample of serosity of a natural rubber latex was adsorbed on a chip, (2) the chip is washed with a washing buffer so that only the adsorbed protein is remained, (3) an energy absorbing substance is applied on the adsorbed protein, (4) the protein on the chip is ionized by irradiating with laser beam, and (5) the molecular weight was measured by using a TOF type mass spectrograph.

the deproteinized natural rubber latex by a conventional treatment using an enzyme are shown in FIG. 3, respectively.

The molecular weight of control samples obtained from the HA latex, which has been subjected to neither protein decomposition treatment nor protein removing treatment, was analyzed. The measurement results are shown in FIG. 10.

As is apparent from the measurement results of the analysis of the molecular weight, in Comparative Example 1 (FIG. 3), a peak existed at the position (position corresponding to the existence of the protein) where the number-average molecular weight <Mn> is about 4700. To the contrary, in both cases where only the protein decomposition treatment was carried out (FIG. 1) and the removing treatment of the protein and the decomposition product was further carried out (FIG. 2) of Example 1, a peak was not observed in the range where the number-average molecular weight <Mn> is about 4500 or more. In case where the removing treatment of the protein and the decomposition product was further carried out, in addition to the protein decomposition treatment (FIG. 2), a peak was not observed in the range where the number-average molecular weight <Mn> is from 1500 to 4500.

[Preparation of Deproteinized Natural Rubber Latex]

Example 7

(Decomposition of protein by alkali protease)

To 100 parts by weight of a rubber content of a field latex, 1.0 parts by weight of a nonionic surfactant and 0.12% of sodium naphthenate were added, thereby to stabilize the latex. To 100 parts by weight of the rubber content of this latex, 0.1 parts by weight of an alkali protease was added, and then the latex was aged by allowing to stand at 30° C. for 24 hours.

As the alkali protease, a protease, which is a protease derived from bacteria and is produced by microorganisms which belong to *Bacillus licheniformis* as a kind of bacteria of the genus Bacillus [manufactured by Novo-Nordisk Bioindustri A/S under the trade name of "Alcalase 2.0M", was used. This alkali protease had a potency of 2.0 AU/g (pH 8.3) and has an optimum pH in an alkali range, as shown in Table 1, and also has an endopeptidase but has no exopeptidase activity.

(Decomposition of protein by protease having exopeptidase activity)

To the aged latex, an aqueous 5% sodium dihydrogenphosphate solution was added, thereby to adjust the pH to 7.0. To 100 parts by weight of the rubber content of the latex, 0.1 parts by weight of a protease having an exopeptidase activity was added. After the addition of the protease, the latex was aged again by allowing to stand at 30° C. for 24 hours.

As the protease, a protease, which has both an exopeptidase activity and an endopeptidase activity and an optimum pH in a neutral range, and is also produced by microorganisms which belong to *Aspergillus oryzae* [manufactured by Amano Enzyme, Inc. under the trade name of "Umamizyme"], was used (see Table 2). This protease had a peptidase activity of 70 u/g or more (pH 7.0, LGG (L-Leucyl-Glycyl-Glycine) method).

(Removal of protein and decomposition product thereof)

After the completion of the enzyme treatment, the latex was diluted with an aqueous 1% solution of a nonionic surfactant, thereby to reduce the rubber content of the latex to 10%, and then subjected to a centrifugation treatment at 13000 rpm for 30 minutes. The cream component thus separated in the upper layer was diluted again and then subjected to the second centrifugation treatment in the same manner as described above.

The resulting cream component was dispersed again in water to obtain a deproteinized natural rubber latex.

Example 8

(Decomposition of protein by alkali protease)

A high ammonia latex (hereinafter referred to as a "HA latex") was diluted so that so that the rubber content is reduced to 30% by weight. To 100 parts by weight of a rubber content of a field latex, 1.0 parts by weight of a nonionic surfactant and 0.12% of sodium naphthenate were added, thereby to stabilize the latex. To 100 parts by weight of the rubber content of this latex, 0.1 parts by weight of an alkali protease (aforementioned "Alcalase 2.0M") was added, and then the latex was aged by allowing to stand at 30° C. for 24 hours.

(Decomposition of protein by protease having exopeptidase activity)

To the aged latex, an aqueous 5% sodium dihydrogenphosphate solution was added, thereby to adjust the pH to 7.0. To 100 parts by weight of the rubber content of the latex, 0.1 parts by weight of a protease having an exopeptidase activity (aforementioned "Umamizyme") was added. After the addition of the protease, the latex was aged again by allowing to stand at 30° for 24 hours.

(Removal of protein and decomposition product thereof)

After the completion of the enzyme treatment, the latex was diluted with an aqueous 1% solution of a nonionic surfactant, thereby to reduce the rubber content of the latex to 10%, and then subjected to a centrifugation treatment at 13000 rpm for 30 minutes.

The cream component thus separated in the upper layer was diluted again and then subjected to the second centrifugation treatment in the same manner as described above.

The resulting cream component was dispersed again in water to obtain a deproteinized natural rubber latex.

Example 9

(Decomposition of protein by alkali protease)

In the same manner as in case of the "decomposition of the protein by the alkali protease" of Example 7, the protein in the field latex was decomposed by the alkali protease (aforementioned "Alcalase 2.0M").

(Decomposition of protein by protease having exopeptidase activity)

In the same manner as in case of the "decomposition of the protein by the protease having an exopeptidase activity" of Example 7, except that a protease produced by microorganisms which belong to *Aspergillus mellus* [manufactured by Amano Enzyme, Inc. under the trade name of P "Amano" 3G] was used as the protease having an exopeptidase activity in place of aforementioned "Umamizyme" and that the amount was changed to 0.1 parts by weight based on 100 parts by weight of the rubber content of the latex, the decomposition treatment of the protein was carried out.

The protease P "Amano" 3G is a protease, which has a protein digestion potency of 10000 u/g or more (pH 7.0, Amano method) and has both an exopeptidase activity and an endopeptidase activity and also has an optimum pH in a neutral range as shown in Table 2.

(Removal of protein and decomposition product thereof)

In the same manner as in case of the "removal of the protein and the decomposition product thereof" of Example 7, except that the latex was used after the completion of the enzyme treatment by the protease P "Amano" 3G, the centrifugation treatment was carried out to obtain a deproteinized natural rubber latex.

Example 10

(Decomposition of protein by alkali protease)

In the same manner as in case of the "decomposition of the protein by the alkali protease" of Example 8, the protein in the HA latex was decomposed by the alkali protease (aforementioned "Alcalase 2.0M").

(Decomposition of protein by protease having exopeptidase activity)

In the same manner as in case of the "decomposition of the protein by the protease having an exopeptidase activity" of Example 8, except that aforementioned P "Amano" 3G was used as the protease having an exopeptidase activity in place of aforementioned "Umamizyme" and that the amount was changed to 0.1 parts by weight based on 100 parts by weight of the rubber content of the latex, the decomposition treatment of the protein was carried out.

(Removal of protein and decomposition product thereof)

In the same manner as in case of the "removal of the protein and the decomposition product thereof" of Example 8, except that the latex was used after the completion of the enzyme treatment by the protease P "Amano" 3G, the centrifugation treatment was carried out to obtain a deproteinized natural rubber latex.

Example 11

(Decomposition of protein by alkali protease)

In the same manner as in case of the "decomposition of the protein by the alkali protease" of Example 8, the protein in the field latex was decomposed by the alkali protease (aforementioned "Alcalase 2.0M").

(Decomposition of protein by protease having exopeptidase activity)

In the same manner as in case of the "decomposition of the protein by the protease having an exopeptidase activity" of Example 8, except that a protease produced by microorganisms which belong to *Rhizopus oryzae* [manufactured by Amano Enzyme, Inc. under the trade name of "Peptidase R"] was used as the protease having an exopeptidase activity in place of aforementioned "Umamizyme" and that the amount was changed to 0.1 parts by weight based on 100 parts by weight of the rubber content of the latex, the decomposition treatment of the protein was carried out.

The protease "Peptidase R" is a protease, which has a peptidase activity of 420 u/g or more (pH 7.0, LGG method) and has both an exopeptidase activity and an endopeptidase activity and also has an optimum pH in a neutral range as shown in Table 2.

(Removal of protein and decomposition product thereof)

In the same manner as in case of the "removal of the protein and the decomposition product thereof" of Example 8, except that the latex was used after the completion of the enzyme treatment by the protease "Peptidase R", the centrifugation treatment was carried out to obtain a deproteinized natural rubber latex.

Example 12

(Decomposition of protein by alkali protease)

In the same manner as in case of the "decomposition of the protein by the alkali protease" of Example 8, the protein in the field latex was decomposed by the alkali protease (aforementioned "Alcalase 2.0M").

(Decomposition of protein by protease having exopeptidase activity)

In the same manner as in case of the "decomposition of the protein by the protease having an exopeptidase activity" of Example 8, except that aforementioned "Peptidase R" was used as the protease having an exopeptidase activity in place of aforementioned "Umamizyme" and that the amount was changed to 0.1 parts by weight based on 100 parts by weight of the rubber content of the latex, the decomposition treatment of the protein was carried out.

(Removal of protein and decomposition product thereof)

In the same manner as in case of the "removal of the protein and the decomposition product thereof" of Example 8, except that the latex was used after the completion of the enzyme treatment by the protease "Peptidase R", the centrifugation treatment was carried out to obtain a deproteinized natural rubber latex.

Comparative Example 2

A deproteinized natural rubber latex was prepared according to the method described in Japanese Patent No. 2,905,005.

A HA latex was diluted so that the rubber content is reduced to 30% by weight. To 100 parts by weight of a rubber content of a field latex, 0.1 parts by weight of an alkali protease, 1.0 parts by weight of a nonionic surfactant and 0.12% of sodium naphthenate were added, thereby to stabilize the latex.

As the alkali protease, a protease, which is a protease derived from bacteria and is produced by microorganisms which belong to *Bacillus licheniformis* as a kind of bacteria of the genus Bacillus [manufactured by Novo-Nordisk Bio-industri A/S under the trade name of "Alcalase 2.0M"], was used. This alkali protease had a potency of 2.0 AU/g (pH 8.3) and has an optimum pH in an alkali range, as shown in Table 1, and also has an endopeptidase but has no exopeptidase activity.

After adjusting the pH to 9.2 by using sodium dihydrogenphosphate, the latex was aged by allowing to stand at 30° C. for 24 hours.

After the completion of the enzyme treatment, the latex was diluted with an aqueous 1% solution of a nonionic surfactant, thereby to reduce the rubber content of the latex to 10%, and then subjected to a centrifugation treatment at 13000 rpm for 30 minutes. The cream component thus separated in the upper layer was dispersed again in water to obtain a deproteinized natural rubber latex.

[Evaluation of Protein Decomposition Treatment]

(Measurement of nitrogen content)

Using each of latexes prepared by dispersing again a cream component formed after the centrifugation treatment in Examples 7 to 12 and Comparative Example 2 in water, and the latex was spread over a glass plate to obtain a cast film.

These cast films were used as samples for measuring the nitrogen content.

Furthermore, cast films were made directly from the HA latex, which has been subjected to neither protein decomposition treatment nor washing treatment, and these films were used as samples of control.

With respect to respective samples of Examples 7 to 12, Comparative Example 2 and control, the nitrogen content (N%) was measured by a RRIM test method (Rubber Research Institute of Malaysia (1973). 'SMR Bulletin No. 7').

The measurement results of the nitrogen content (N%) are shown in Table 4.

(Measurement of content index of allergenic protein)

According to a RAST-inhibition method, a content index of an allergenic protein contained in each of the natural rubber latexes obtained in Examples 7 to 12 and Comparative Example 2 was measured. The "content index of the allergenic protein" was measured by a competitive immunity inhibition method using aforementioned Pharmacia Cap system in Deutsche BGFA (Berufsgenossenschaftliches Forschungsinstitut für Arbeitsmedizin).

Also with respect to the deproteinized natural rubber latexes obtained in Examples 7 to 12 and Comparative Example 2 as measuring samples in the same manner, the amount of the residual antibody was determined and the content index of the allergenic protein was calculated.

The measurement results of the content index of the allergenic protein are shown in Table 4.

TABLE 4

| Kinds of latex | | Protein decomosition treatment | | Nitrogen content (N %) | Content index of allergenic protein |
|---|---|---|---|---|---|
| | | Kind of protease | Amount (parts by weight) | | |
| Example 7 | Field latex | 1) Alcalase 2.0M<br>2) Umamizyme | 1) 0.1<br>2) 0.1 | 0.018 | 2.1 μg/g |
| Example 8 | HA latex | 1) Alcalase 2.0M<br>2) Umamizyme | 1) 0.1<br>2) 0.1 | 0.012 | n.d |
| Example 9 | Field latex | 1) Alcalase 2.0M<br>2) P "Amano" 3G | 1) 0.1<br>2) 0.1 | 0.017 | n.d |
| Example 10 | HA latex | 1) Alcalase 2.0M<br>2) P "Amano" 3G | 1) 0.1<br>2) 0.1 | 0.011 | n.d |
| Example 11 | Field latex | 1) Alcalase 2.0M<br>2) Peptidase R | 1) 0.1<br>2) 0.1 | 0.018 | n.d |
| Example 12 | HA latex | 1) Alcalase 2.0M<br>2) Peptidase R | 1) 0.1<br>2) 0.1 | 0.011 | n.d |
| Comp. Example 2 | HA latex | Alcalase 2.0M | 0.1 | 0.012 | 11.1 μg/g |
| Control | HA latex | — | — | 0.334 | 1060 μg/g |

*: The terms 1) and 2) in the column of the protein decomposition treatment denote the treatment by an alkali protease and the treatment by a protease having an exopeptidase activity, respectively
*: Amount (parts by weight) of protease is a value based on 100 parts by weight of the rubber content of the latex.
*: n.d. denotes a value lower than a detection limit (2 μg/g).

As is apparent from Table 4, although the deproteinized natural rubbers of Examples 7 to 12 have the same nitrogen content (N%) as that of the deproteinized natural rubber of Comparative Example 2, the content index of the allergenic protein was markedly low and, therefore, a possibility of causing allergy due to the protein is markedly reduced. It has been found that, in Examples 8 to 12, the rubbers are deproteinized to such a degree that the allergenic protein can not be detected.

(Analysis of molecular weight of protein)

With respect to the natural rubber latexes obtained in Examples 7 to 10 and Comparative Example 2, it was analyzed whether or not impurities having a number-average molecular weight <Mn> within a range from 4500 to 4700 exist, using an analysis system of a protein, comprising a combination of a time of flight (TOF) type mass spectrometer and a two-dimensional surface decorative chip [for example, protein structure analyzer "Protein Chip™ System", manufactured by Ciphergen Biosystems, Inc.].

The analysis of the molecular weight of the protein by the above "Protein Chip™ System" was carried out in the following procedure. (1) First, a sample of serosity of a natural rubber latex was adsorbed on a chip, (2) the chip is washed with a washing buffer so that only the adsorbed protein is remained, (3) an energy absorbing substance is applied on the adsorbed protein, (4) the protein on the chip is ionized by irradiating with laser beam, and (5) the molecular weight was measured by using a TOF type mass spectrograph.

Figure 5:
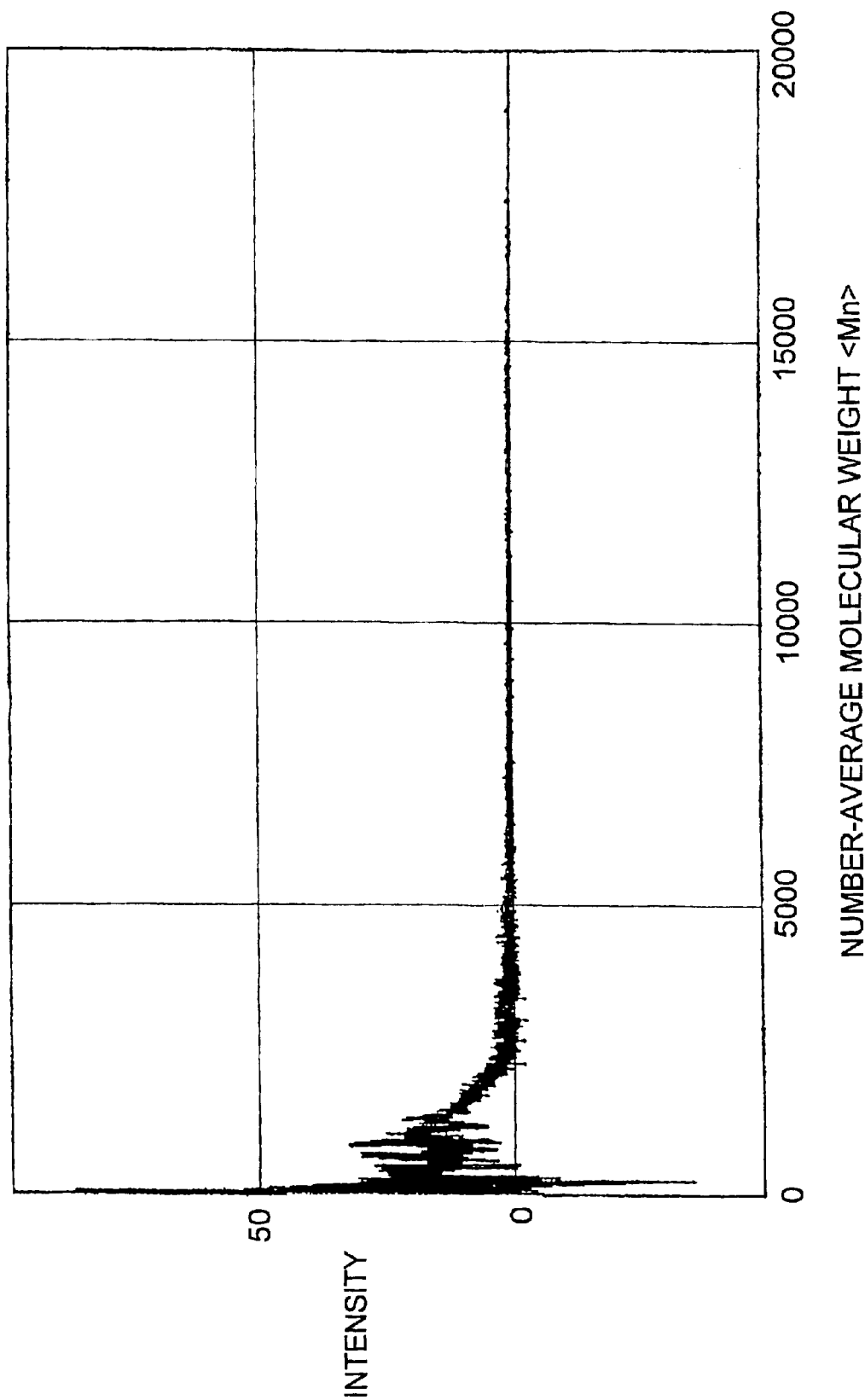
FIG. 5 is a graph showing the measurement results of a number-average molecular weight <Mn> of the remaining protein and protein decomposition product with respect to deproteinized natural rubber latexes obtained in Examples 7 and 19.
Figure 6:
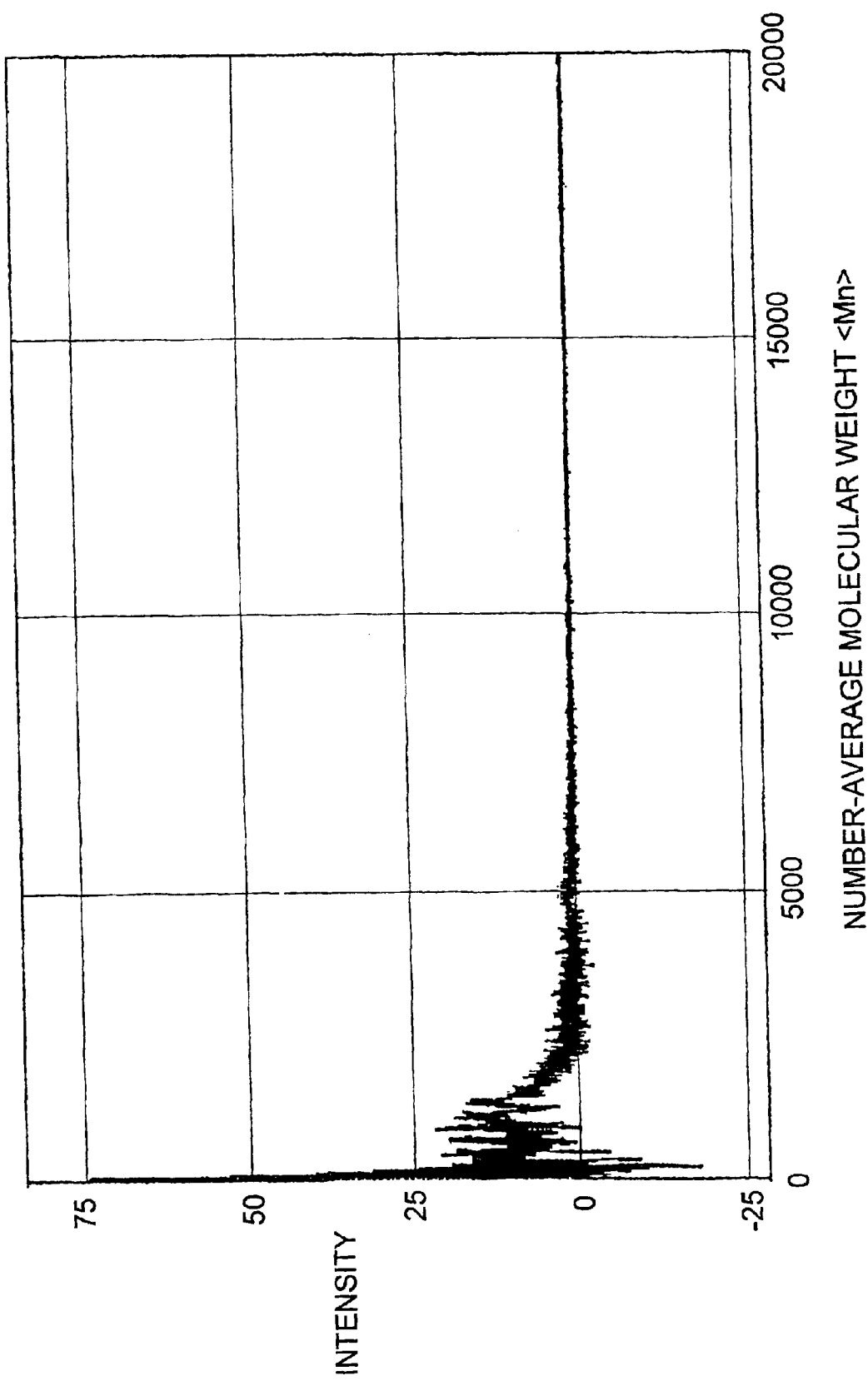
FIG. 6 is a graph showing the measurement results of a number-average molecular weight <Mn> of the remaining protein and protein decomposition product with respect to deproteinized natural rubber latexes obtained in Examples 9 and 21.
Figure 7:
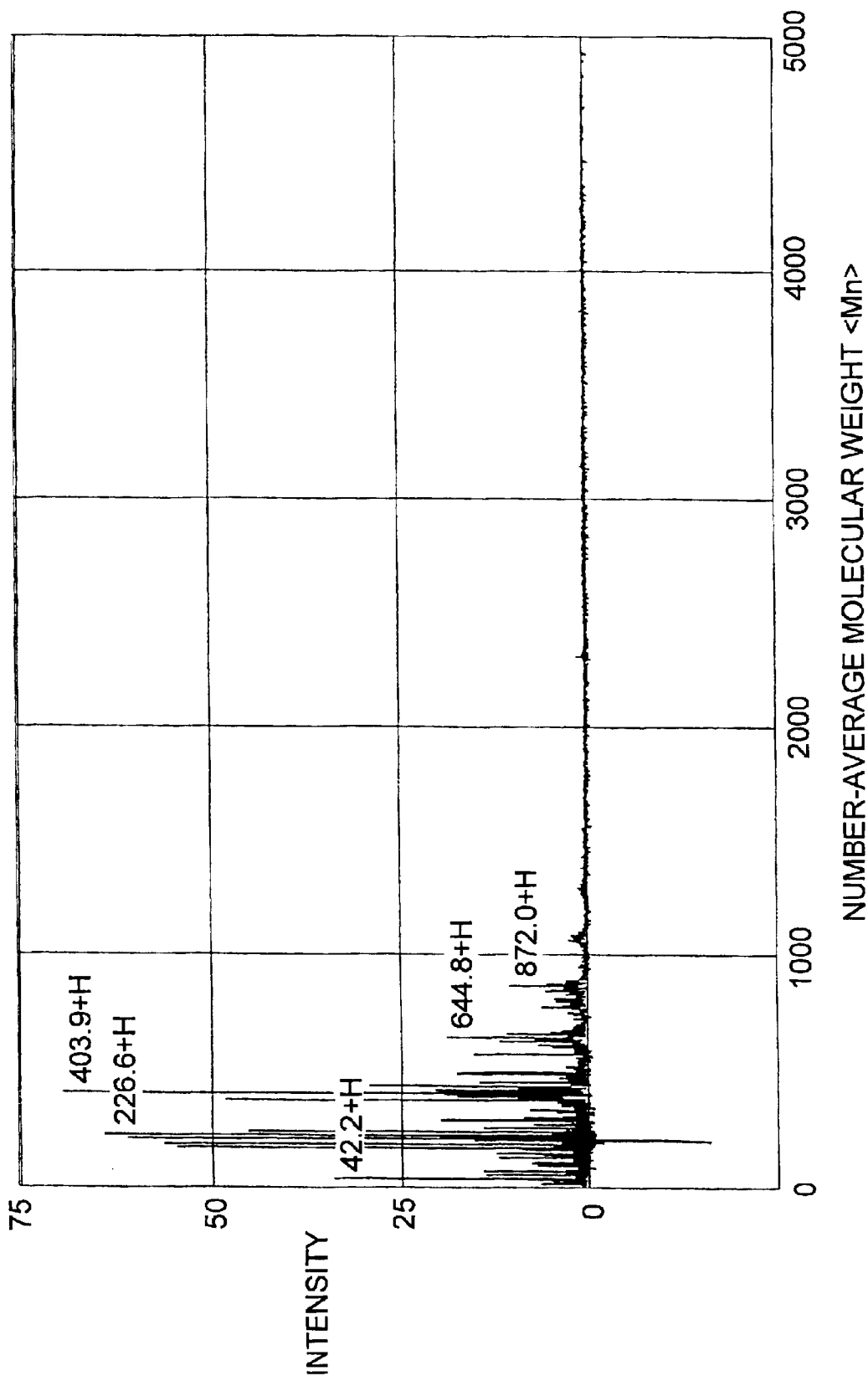
FIG. 7 is a graph showing the measurement results of a number-average molecular weight <Mn> of the remaining protein and protein decomposition product with respect to deproteinized natural rubber latexes obtained in Examples 8 and 22.

With respect to the analysis results of the number-average molecular weight <Mn> about the remained protein and protein decomposition product, the measurement results of samples obtained from the deproteinized natural rubber latex of Example 7 are shown in FIG. 5, the measurement results of samples obtained from the deproteinized natural rubber latex of Example 8 are shown in FIG. 7, the measurement results of samples obtained from the deproteinized natural rubber latex of Example 9 are shown in FIG. 6, the measurement results of samples obtained from the deproteinized natural rubber latex of Example 10 are shown in FIG. 8, and the measurement results of samples obtained from the deproteinized natural rubber latex of Comparative Example 2 by a conventional treatment using an enzyme are shown in FIG. 3, respectively.

Figure 4:
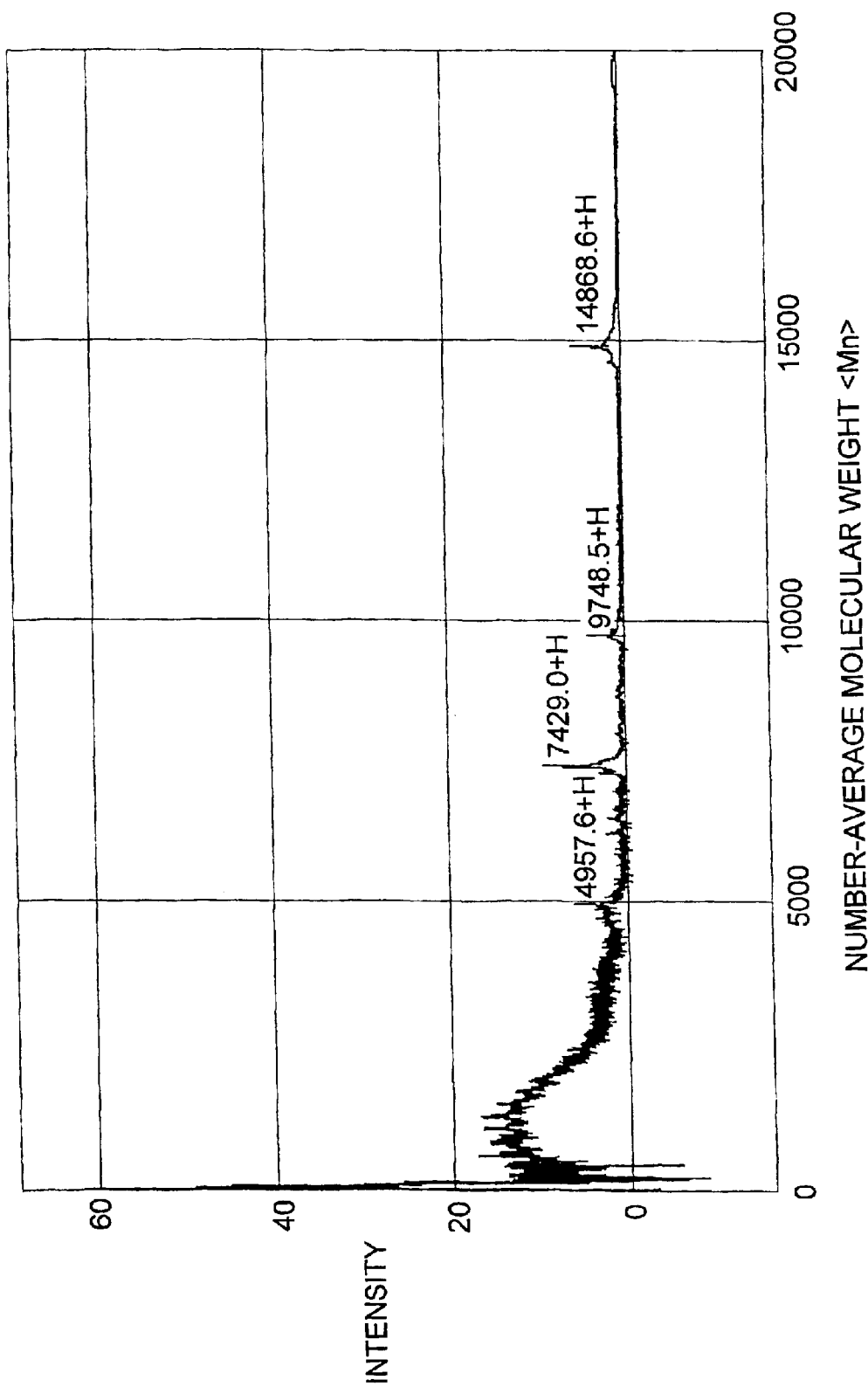
FIG. 4 is a graph showing the measurement results of a number-average molecular weight <Mn> with respect to the protein remaining in a high ammonia-treated latex.

The molecular weight of control samples obtained from the HA latex, which has been subjected to neither protein decomposition treatment nor protein removing treatment, was analyzed. The measurement results are shown in FIG. 4.

As is apparent from the measurement results of the analysis of the molecular weight, in Comparative Example 2 (FIG. 3), a peak existed at the position (position corresponding to the existence of the protein) where the number-average molecular weight <Mn> is about 4700. To the contrary, in Example 7 (FIG. 5) and Example 9 (FIG. 6), a peak was not observed in the range where the number-average molecular weight <Mn> is about 2000 or more. In Example 8 (FIG. 7) and Example 10 (FIG. 8), a peak was not observed in the range where the number-average molecular weight <Mn> is 4500 or more.

[Preparation of Low Allergenic Natural Rubber]

Example 13

(Only protein decomposition treatment)

To 100 parts by weight of a rubber content of a field latex, 1.0 parts by weight of a nonionic surfactant and 0.12% of sodium naphthenate were added, thereby to stabilize the latex, and then the pH of the latex was adjusted to 7.0 by using an aqueous 5% sodium dihydrogenphosphate solution. To 100 parts by weight of the rubber content of this latex, 0.1 parts by weight of a protease having an exopeptidase activity was added, and then the latex was aged by allowing to stand at 30° C. for 24 hours to obtain a low allergenic natural rubber latex which has been subjected to a protein decomposition treatment.

As the protease, a protease, which has both an exopeptidase activity and an endopeptidase activity and an optimum pH in a neutral range, and is also produced by microorganisms which belong to *Aspergillus oryzae* (manufactured by Amano Enzyme, Inc. under the trade name of "Umamizyme"], was used (see Table 2). This protease had a peptidase activity of 70 u/g or more (pH 7.0, LGG (L-Leucyl-Glycyl-Glycine) method).

Furthermore, the rubber component of the low allergenic natural rubber latex thus obtained was coagulated and dried to obtain a low allergenic natural rubber latex which has been subjected to a protein decomposition treatment.

The coagulation was carried out according to acid coagulation method. The solid content of the latex obtained above was adjusted to 10%, and then formic acid (87%) was added to coagulate the rubber component. The resulting rubber containing water to a great content was passed through rollers under cleaning to remove a large portion of water and to give a rubber sheet. The resulting rubber sheet was air-dried for 4 days and finally dried in oven at 60° C. for 3 days to obtain the solid rubber. In the following Examples and Reference Examples, solid rubbers were obtained according to the same method stated above.

(Protein decomposition treatment and protein removing treatment)

The low allergenic natural rubber latex which has been subjected to the protein decomposition treatment was diluted with an aqueous 1% solution of a nonionic surfactant, thereby to reduce the rubber content of the latex to 10%, and then subjected to a centrifugation treatment at 13000 rpm for 30 minutes. The cream component thus separated in the upper layer was taken out and then dispersed again in the same amount of water to obtain a low allergenic natural rubber latex which has been subjected to a protein decomposition treatment and a protein removing treatment.

Furthermore, the cream component was dried to obtain a low allergenic natural rubber latex which has been subjected to a protein decomposition treatment and a protein removing treatment.

Example 14

(Only protein decomposition treatment)

A high ammonia latex (hereinafter referred to as a "HA latex") was diluted so that the rubber content is reduced to 30% by weight. To 100 parts by weight of a rubber content of the latex, 1.0 parts by weight of a nonionic surfactant and 0.12% of sodium naphthenate (stabilizer) were added, thereby to stabilize the latex, and then the pH of the latex was adjusted to 7.0 by using an aqueous 5% sodium dihydrogenphosphate solution. To 100 parts by weight of the rubber content of this latex, 0.1 parts by weight of a protease (aforementioned "Umamizyme") was added, and then the latex was aged by allowing to stand at 30° C. for 24 hours to obtain a low allergenic natural rubber latex which has been subjected to a protein decomposition treatment.

Furthermore, the rubber component of the low allergenic natural rubber latex thus obtained was coagulated and dried to obtain a low allergenic natural rubber latex which has been subjected to a protein decomposition treatment.

(Protein decomposition treatment and protein removing treatment)

The low allergenic natural rubber latex which has been subjected to the protein decomposition treatment was diluted with an aqueous 1% solution of a nonionic surfactant, thereby to reduce the rubber content of the latex to 10%, and then subjected to a centrifugation treatment at 13000 rpm for 30 minutes. The cream component thus separated in the upper layer was taken out and then dispersed again in the same amount of water to obtain a low allergenic natural rubber latex which has been subjected to a protein decomposition treatment and a protein removing treatment.

Furthermore, the cream component was dried to obtain a low allergenic natural rubber latex which has been subjected to a protein decomposition treatment and a protein removing treatment.

Example 15

(Only protein decomposition treatment)

In the same manner as in Example 13 (namely, the field latex is used as a starting material), except that a protease produced by microorganisms which belong to *Aspergillus mellus* [manufactured by Amano Enzyme, Inc. under the trade name of P "Amano" 3G] was used as the protease having an exopeptidase activity in place of aforementioned "Umamizyme" and that the amount was changed to 0.1 parts by weight based on 100 parts by weight of the rubber content of the latex, the decomposition treatment of the protein was carried out to obtain a low allergenic natural rubber latex.

The protease P "Amano" 3G is a protease, which has a protein digestion potency of 10000 u/g or more (pH 7.0, Amano method) and has both an exopeptidase activity and an endopeptidase activity and also has an optimum pH in a neutral range as shown in Table 2.

Furthermore, the rubber allergenic component of the low allergenic natural rubber latex thus obtained was coagulated and dried to obtain a low allergenic natural rubber latex which has been subjected to a protein decomposition treatment.

(Protein decomposition treatment and protein removing treatment)

In the same manner as in Example 13, the low allergenic natural rubber latex which has been subjected to the protein decomposition treatment by the protease P "Amano" 3G was subjected to the dilution treatment, the centrifugation treatment and the redispersion treatment to obtain a low allergenic natural rubber latex which has been subjected to a protein decomposition treatment and a protein removing treatment.

Furthermore, the cream component was dried to obtain a low allergenic natural rubber latex which has been subjected to a protein decomposition treatment and a protein removing treatment.

Example 16

(Only protein decomposition treatment)

In the same manner as in Example 14 (namely, the HA latex is used as a starting material), except that aforementioned P "Amano" 3G was used as the protease having an exopeptidase activity in place of aforementioned "Umamizyme" and that the amount was changed to 0.1 parts by weight based on 100 parts by weight of the rubber content of the latex, the decomposition treatment of the protein was carried out to obtain a low allergenic natural rubber latex.

Furthermore, the rubber component of the low allergenic natural rubber latex thus obtained was coagulated and dried to obtain a low allergenic natural rubber latex which has been subjected to a protein decomposition treatment.

(Protein decomposition treatment and protein removing treatment)

In the same manner as in Example 14, the low allergenic natural rubber latex which has been subjected to the protein decomposition treatment by the protease P "Amano" 3G was subjected to the dilution treatment, the centrifugation treatment and the redispersion treatment to obtain a low allergenic natural rubber latex which has been subjected to a protein decomposition treatment and a protein removing treatment.

Furthermore, the cream component was dried to obtain a low allergenic natural rubber latex which has been subjected to a protein decomposition treatment and a protein removing treatment.

Example 17

(Only protein decomposition treatment)

In the same manner as in Example 13 (namely, the field latex is used as a starting material), except that a protease produced by microorganisms which belong to *Rhizopus oryzae* [manufactured by Amano Enzyme, Inc. under the trade name of "Peptidase R"] was used as the protease having an exopeptidase activity in place of aforementioned "Umamizyme" and that the amount was changed to 0.1 parts by weight based on 100 parts by weight of the rubber content of the latex, the decomposition treatment of the protein was carried out to obtain a low allergenic natural rubber latex.

The protease "Peptidase R" is a protease, which has a peptidase activity of 420 u/g or more (pH 7.0, LGG method) and has both an exopeptidase activity and an endopeptidase activity and also has an optimum pH in a neutral range as shown in Table 2.

Furthermore, the rubber component of the low allergenic natural rubber latex thus obtained was coagulated and dried to obtain a low allergenic natural rubber latex which has been subjected to a protein decomposition treatment.

(Protein decomposition treatment and protein removing treatment)

In the same manner as in Example 13, the low allergenic natural rubber latex which has been subjected to the protein decomposition treatment was subjected to the dilution treatment, the centrifugation treatment and the redispersion treatment to obtain a low allergenic natural rubber latex which has been subjected to a protein decomposition treatment and a protein removing treatment.

Furthermore, the cream component was dried to obtain a low allergenic natural rubber latex which has been subjected to a protein decomposition treatment and a protein removing treatment.

Example 18

(Only protein decomposition treatment)

In the same manner as in Example 14 (namely, the HA latex is used as a starting material), except that aforementioned "Peptidase R" was used as the protease having an exopeptidase activity in place of aforementioned "Umamizyme" and that the amount was changed to 0.1 parts by eight based on 100 parts by weight of the rubber content of the latex, the decomposition treatment of the protein was carried out to obtain a low allergenic natural rubber latex.

Furthermore, the rubber component of the low allergenic natural rubber latex thus obtained was coagulated and dried to obtain a low allergenic natural rubber latex which has been subjected to a protein decomposition treatment.

(Protein decomposition treatment and protein removing treatment)

In the same manner as in Example 14, the low allergenic natural rubber latex which has been subjected to the protein decomposition treatment by the protease "Peptidase R" was subjected to the dilution treatment, the centrifugation treatment and the redispersion treatment to obtain a low allergenic natural rubber latex which has been subjected to a protein decomposition treatment and a protein removing treatment.

Furthermore, the cream component was dried to obtain a low allergenic natural rubber latex which has been subjected to a protein decomposition treatment and a protein removing treatment.

Comparative Example 3

(Only protein decomposition treatment)

To 100 parts by weight of a rubber content of a field latex, 0.1 parts by weight of an alkali protease, 1.0 parts by weight of a nonionic surfactant and 0.12% of sodium naphthenate were added, thereby to stabilize the latex.

As the alkali protease, a protease, which is derived from bacteria and is also produced by microorganisms which belong to *Bacillus licheniformis* [manufactured by Novo-Nordisk Bioindustri A/S under the trade name of "Alcalase 2.0M"], was used. This alkali protease had a potency of 2.0 AU/g (pH 8.3) and has an optimum pH in an alkali range, as shown in Table 1, and also has an endopeptidase but has no exopeptidase activity.

After adjusting the pH to 9.2 by using sodium dihydrogenphosphate, the latex was aged by allowing to stand at 30° C. for 24 hours to obtain a natural rubber latex which has been subjected to a protein decomposition treatment.

(Protein decomposition treatment and protein removing treatment)

The low allergenic natural rubber latex which has been subjected to the protein decomposition treatment was diluted with an aqueous 1% solution of a nonionic surfactant, thereby to reduce the rubber content of the latex to 10%, and then subjected to a centrifugation treatment at 13000 rpm for 30 minutes. The cream component thus separated in the upper layer was taken out and then dispersed again in the same amount of water to obtain a natural rubber latex which has been subjected to a protein decomposition treatment and a protein removing treatment.

Furthermore, the cream component was dried to obtain a deproteinized natural rubber latex.

[Evaluation of Protein Decomposition Treatment]

The results of the evaluation of the protein decomposition treatment (the measurement of the nitrogen content and the measurement of the content index of the allergenic protein) in Examples 13 to 18 and Comparative Example 3 are the same as those in Examples 1 to 6 and Comparative Example 1.

(Analysis of molecular weight of protein)

The results of the analysis of the molecular weight of the protein with respect to the natural rubber latexes obtained in Example 13 and Comparative Example 3 are the same as those in Example 1 (FIG. 1) and Comparative Example 1 (FIG. 3).

[Preparation of Deproteinized Natural Rubber]

Example 19

(Decomposition of protein by alkali protease)

To 100 parts by weight of a rubber content of a field latex, 1.0 parts by weight of a nonionic surfactant and 0.12% of sodium naphthenate were added, thereby to stabilize the latex. To 100 parts by weight of the rubber content of this latex, 0.1 parts by weight of an alkali protease was added, and then the latex was aged by allowing to stand at 30° C. for 24 hours.

As the alkali protease, a protease, which is a protease derived from bacteria and is produced by microorganisms which belong to *Bacillus licheniformis* as a kind of bacteria of the genus Bacillus [manufactured by Novo-Nordisk Bioindustri A/S under the trade name of "Alcalase 2.0M"], was used. This alkali protease had a potency of 2.0 AU/g (pH 8.3) and has an optimum pH in an alkali range, as shown in Table 1, and also has an endopeptidase but has no exopeptidase activity.

(Decomposition of protein by protease having exopeptidase activity)

To the aged latex, an aqueous 5% sodium dihydrogenphosphate solution was added, thereby to adjust the pH to 7.0. To 100 parts by weight of the rubber content of the latex, 0.1 parts by weight of a protease having an exopeptidase activity was added. After the addition of the protease, the latex was aged again by allowing to stand at 30° C. for 24 hours.

As the protease, a protease, which has both an exopeptidase activity and an endopeptidase activity and an optimum pH in a neutral range, and is also produced by microorganisms which belong to Aspergillus oryzae [manufactured by Amano Enzyme, Inc. under the trade name of "Umamizyme"], was used (see Table 2). This protease had a peptidase activity of 70 u/g or more (pH 7.0, LGG (L-Leucyl-Glycyl-Glycine) method).

(Removal of protein and decomposition product thereof)

After the completion of the enzyme treatment, the latex was diluted with an aqueous 1% solution of a nonionic surfactant, thereby to reduce the rubber content of the latex to 10%, and then subjected to a centrifugation treatment at 13000 rpm for 30 minutes. The cream component thus separated in the upper layer was diluted again and then subjected to the second centrifugation treatment in the same manner as described above.

The resulting cream component was dispersed again in water to obtain a deproteinized natural rubber latex. The deproteinized natural rubber latex was coagulated and dried to obtain a deproteinized natural rubber.

Example 20

(Decomposition of protein by alkali protease)

A high ammonia latex (hereinafter referred to as a "HA latex") was diluted so that so that the rubber content is reduced to 30% by weight. To 100 parts by weight of a rubber content of a field latex, 1.0 parts by weight of a nonionic surfactant and 0.12% of sodium naphthenate were added, thereby to stabilize the latex. To 100 parts by weight of the rubber content of this latex, 0.1 parts by weight of an alkali protease (aforementioned "Alcalase 2.0M") was added, and then the latex was aged by allowing to stand at 30° C. for 24 hours.

(Decomposition of protein by protease having exopeptidase activity)

To the aged latex, an aqueous 5% sodium dihydrogenphosphate solution was added, thereby to adjust the pH to 7.0. To 100 parts by weight of the rubber content of the latex, 0.1 parts by weight of a protease having an exopeptidase activity (aforementioned "Umamizyme") was added. After the addition of the protease, the latex was aged again by allowing to stand at 30° C. for 24 hours.

(Removal of protein and decomposition product thereof)

After the completion of the enzyme treatment, the latex was diluted with an aqueous 1% solution of a nonionic surfactant, thereby to reduce the rubber content of the latex to 10%, and then subjected to a centrifugation treatment at 13000 rpm for 30 minutes.

The cream component thus separated in the upper layer was diluted again and then subjected to the second centrifugation treatment in the same manner as described above.

The resulting cream component was dispersed again in water to obtain a deproteinized natural rubber latex. The deproteinized natural rubber latex was coagulated and dried to obtain a deproteinized natural rubber.

Example 21

(Decomposition of protein by alkali protease)

In the same manner as in case of the "decomposition of the protein by the alkali protease" of Example 19, the protein in the field latex was decomposed by the alkali protease (aforementioned "Alcalase 2.0M").

(Decomposition of protein by protease having exopeptidase activity)

In the same manner as in case of the "decomposition of the protein by the protease having an exopeptidase activity" of Example 19, except that a protease produced by microorganisms which belong to Aspergillus mellus [manufactured by Amano Enzyme, Inc. under the trade name of P "Amano" 3G] was used as the protease having an exopeptidase activity in place of aforementioned "Umamizyme" and that the amount was changed to 0.1 parts by weight based on 100 parts by weight of the rubber content of the latex, the decomposition treatment of the protein was carried out.

The protease P "Amano" 3G is a protease, which has a protein digestion potency of 10000 u/g or more (pH 7.0, Amano method) and has both an exopeptidase activity and an endopeptidase activity and also has an optimum pH in a neutral range as shown in Table 2.

(Removal of protein and decomposition product thereof)

In the same manner as in case of the "removal of the protein and the decomposition product thereof" of Example 19, except that the latex was used after the completion of the enzyme treatment by the protease P "Amano" 3G, the centrifugation treatment was carried out to obtain a deproteinized natural rubber latex and a deproteinized natural rubber.

Example 22

(Decomposition of protein by alkali protease)

In the same manner as in case of the "decomposition of the protein by the alkali protease" of Example 20, the protein in the HA latex was decomposed by the alkali protease (aforementioned "Alcalase 2.0M").

(Decomposition of protein by protease having exopeptidase activity)

In the same manner as in case of the "decomposition of the protein by the protease having an exopeptidase activity" of Example 20, except that aforementioned P "Amano" 3G was used as the protease having an exopeptidase activity in place of aforementioned "Umamizyme" and that the amount was changed to 0.1 parts by weight based on 100 parts by weight of the rubber content of the latex, the decomposition treatment of the protein was carried out.

(Removal of protein and decomposition product thereof)

In the same manner as in case of the "removal of the protein and the decomposition product thereof" of Example 20, except that the latex was used after the completion of the enzyme treatment by the protease P "Amano" 3G, the centrifugation treatment was carried out to obtain a deproteinized natural rubber latex and a deproteinized natural rubber.

Example 23

(Decomposition of protein by alkali protease)

In the same manner as in case of the "decomposition of the protein by the alkali protease" of Example 19, the protein in the field latex was decomposed by the alkali protease (aforementioned "Alcalase 2.0M").

(Decomposition of protein by protease having exopeptidase activity)

In the same manner as in case of the "decomposition of the protein by the protease having an exopeptidase activity" of Example 19, except that a protease produced by microorganisms which belong to Rhizopus oryzae [manufactured by Amano Enzyme, Inc. under the trade name of "Peptidase R"] was used as the protease having an exopeptidase activity in place of aforementioned "Umamizyme" and that the amount was changed to 0.1 parts by weight based on 100 parts by weight of the rubber content of the latex, the decomposition treatment of the protein was carried out.

The protease "Peptidase R" is a protease, which has a peptidase activity of 420 u/g or more (pH 7.0, LGG method) and has both an exopeptidase activity and an endopeptidase activity and also has an optimum pH in a neutral range as shown in Table 2.

(Removal of protein and decomposition product thereof)

In the same manner as in case of the "removal of the protein and the decomposition product thereof" of Example 19, except that the latex was used after the completion of the enzyme treatment by the protease "Peptidase R", the centrifugation treatment was carried out to obtain a deproteinized natural rubber latex and a deproteinized natural rubber.

Example 24

(Decomposition of protein by alkali protease)

In the same manner as in case of the "decomposition of the protein by the alkali protease" of Example 20, the protein in the field latex was decomposed by the alkali protease (aforementioned "Alcalase 2.0M").

(Decomposition of protein by protease having exopeptidase activity)

In the same manner as in case of the "decomposition of the protein by the protease having an exopeptidase activity" of Example 20, except that aforementioned "Peptidase R" was used as the protease having an exopeptidase activity in place of aforementioned "Umamizyme" and that the amount was changed to 0.1 parts by weight based on 100 parts by weight of the rubber content of the latex, the decomposition treatment of the protein was carried out.

(Removal of protein and decomposition product thereof)

In the same manner as in case of the "removal of the protein and the decomposition product thereof" of Example 20, except that the latex was used after the completion of the enzyme treatment by the protease "Peptidase R", the centrifugation treatment was carried out to obtain a deproteinized natural rubber latex and a deproteinized natural rubber.

Comparative Example 4

A deproteinized natural rubber was prepared according to the method described in Japanese Patent No. 2,905,005.

A HA latex was diluted so that the rubber content is reduced to 30% by weight. To 100 parts by weight of a rubber content of a field latex, 0.1 parts by weight of an alkali protease, 1.0 parts by weight of a nonionic surfactant and 0.12% of sodium naphthenate were added, thereby to stabilize the latex.

As the alkali protease, a protease, which is a protease derived from bacteria and is produced by microorganisms which belong to Bacillus licheniformis as a kind of bacteria of the genus Bacillus [manufactured by Novo-Nordisk Bio-industri A/S under the trade name of "Alcalase 2.0M"], was used. This alkali protease had a potency of 2.0 AU/g (pH 8.3) and has an optimum pH in an alkali range, as shown in Table 1, and also has an endopeptidase but has no exopeptidase activity.

After adjusting the pH to 9.2 by using sodium dihydrogenphosphate, the latex was aged by allowing to stand at 30° C. for 24 hours.

After the completion of the enzyme treatment, the latex was diluted with an aqueous 1% solution of a nonionic surfactant, thereby to reduce the rubber content of the latex to 10%, and then subjected to a centrifugation treatment at 13000 rpm for 30 minutes.

The cream component thus separated in the upper layer was dispersed again in water to obtain a deproteinized natural rubber latex. The cream component was coagulated and dried to obtain a deproteinized natural rubber.

[Evaluation of Protein Decomposition Treatment]

The results of the evaluation of the protein decomposition treatment (the measurement of the nitrogen content and the measurement of the content index of the allergenic protein) in Examples 19 to 24 and Comparative Example 4 are the same as those in Examples 7 to 12 and Comparative Example 2 shown in Table 4.

(Measurement of infrared absorption spectrum)

A crude rubber film for measuring an infrared absorption spectrum was obtained by taking out each (36 g) of the deproteinized natural rubber latexes obtained in Example 19 and Comparative Example 4, spreading over the latex on a glass plate of 18 cm×12 cm in size, dried by allowing to stand at room temperature, peeling off from the glass plate, drying the surface contacted with the glass surface for a day, and drying under vacuum.

The film was placed on a KBr plate and the absorbance was measured by a Fourier infrared spectrometer JASCO 5300.

As a result, an absorption at 3280 $cm^{-1}$ of polypeptide could not detected with respect to any samples made from the latexes of Example 19 and Comparative Example 4.

(Analysis of molecular weight of protein)

The results of the analysis of the number-average molecular weight <Mn> of the remained protein and the protein decomposition product with respect to the latexes of Example 19, 20, 21 and 22 and Comparative Example 4 are the same as those shown in FIGS. 5, 6, 7, 8 and 9.

What is claimed is:

1. A method of preparing a low allergenic natural rubber latex, which comprises adding a protease having an exopeptidase activity to a natural rubber latex and aging the natural rubber latex, thereby to decompose a protein in the latex to such a degree that the protein and a protein decomposition product, which have a number-average molecular weight of 4500 or more, are not detected.

2. The method of preparing a low allergenic natural rubber latex according to claim 1, wherein the protein and the decomposition product thereof in the latex are removed after decomposing the protein.

3. The method of preparing a low allergenic natural rubber latex according to claim 2, wherein the protein and the decomposition product thereof are removed by a centrifugation treatment.

4. The method of preparing a low allergenic natural rubber latex according to claim 1, wherein the pH of the latex is adjusted to a neutral range before treating with the protease having an exopeptidase activity.

5. The method of preparing a low allergenic natural rubber latex according to claim 1, wherein the protease having an exopeptidase activity is produced by microorganisms which belong to the genus Aspergillus or Rhizopus.

6. The method of preparing a low allergenic natural rubber latex according to claim 5, wherein the microorganisms which belong to the genus Aspergillus are microorganisms which belong to *Aspergillus oryzae*.

7. The method of preparing a low allergenic natural rubber latex according to claim 5, wherein the microorganisms which belong to the genus Aspergillus are microorganisms which belong to *Aspergillus mellus*.

8. The method of preparing a low allergenic natural rubber latex according to claim 5, wherein the microorganisms which belong to the genus Rhizopus are microorganisms which belong to *Rhizopus oryzae*.

9. The method of preparing a low allergenic natural rubber latex according to claim 1, wherein the decomposition treatment of the protein is carried out in the presence of a surfactant.

10. A low allergenic natural rubber obtained by a decomposition treatment of a protein, wherein the protein and a protein decomposition product, which have a number-average molecular weight of 4500 or more, are not detected; wherein said decomposition treatment is adding a protease having an exopeptidase activity to a natural rubber latex and aging the natural rubber latex.

11. The low allergenic natural rubber according to claim 10, wherein a protein and a protein decomposition product, which have a number-average molecular weight of 1500 or more, are not detected.

12. The low allergenic natural rubber according to claim 10, wherein a content index of an allergenic protein capable of producing an IgE-class antibody in a human blood serum is 10 $\mu$g/g or less.

13. The low allergenic natural rubber according to claim 12, wherein the content index of the allergic protein is 5 $\mu$g/g or less.

* * * * *